US010206100B2

(12) United States Patent
Kulkarni et al.

(10) Patent No.: US 10,206,100 B2
(45) Date of Patent: Feb. 12, 2019

(54) SECURE CONTEXT SHARING FOR PRIORITY CALLING AND VARIOUS PERSONAL SAFETY MECHANISMS

(71) Applicant: McAfee, LLC, Santa Clara, CA (US)

(72) Inventors: Dattatraya Kulkarni, Bangalore (IN); Srikanth Nalluri, Bangalore (IN); Venkatasubrahmanyam Krishnapur, Bangalore (IN); Kaushal Dhruw, Bangalore (IN); Aravind Doss, Bangalore (IN); Raja Sinha, Bangalore (IN); Susmita Nayak, Fremont, CA (US); Yogesh Jain, Cupertino, CA (US)

(73) Assignee: McAfee, LLC, Santa Clara, CA (US)

( * ) Notice: Subject to any disclaimer, the term of this patent is extended or adjusted under 35 U.S.C. 154(b) by 110 days.

(21) Appl. No.: 15/101,479

(22) PCT Filed: Dec. 24, 2014

(86) PCT No.: PCT/US2014/072321
§ 371 (c)(1),
(2) Date: Jun. 3, 2016

(87) PCT Pub. No.: WO2015/103067
PCT Pub. Date: Jul. 9, 2015

(65) Prior Publication Data
US 2016/0345171 A1    Nov. 24, 2016

(30) Foreign Application Priority Data

Jan. 3, 2014   (IN) ............................ 32/CHE/2014

(51) Int. Cl.
*G06F 7/04*   (2006.01)
*G06F 15/16*   (2006.01)
(Continued)

(52) U.S. Cl.
CPC ........ *H04W 12/06* (2013.01); *G06F 21/6245* (2013.01); *H04L 63/18* (2013.01);
(Continued)

(58) Field of Classification Search
USPC ............................................................ 726/6
See application file for complete search history.

(56) References Cited

U.S. PATENT DOCUMENTS 5,987,610 A    11/1999 Franczek et al.
6,073,142 A    6/2000  Geiger et al.
(Continued)

FOREIGN PATENT DOCUMENTS

EP    2 081 369 81    4/2011

OTHER PUBLICATIONS

International Search Report and Written Opinion in International Application No. PCT/US2014/072321, dated Apr. 23, 2015, 13 pages.

*Primary Examiner* — Jeffrey C Pwu
*Assistant Examiner* — Samuel Ambaye
(74) *Attorney, Agent, or Firm* — Patent Capital Group

(57) ABSTRACT

The present disclosure relates to a system and method for providing a secure context exchange cloud service which enables context information to be shared among devices, and providing a safety application which utilizes the context information being shared. In one example, the context exchange cloud service provides secure exchange of the context information, which in turn enables a safety application to enhance personal safety.

25 Claims, 13 Drawing Sheets

(51) Int. Cl.
 *G06F 17/30* (2006.01)
 *H04L 29/06* (2006.01)
 *H04W 12/06* (2009.01)
 *H04W 4/16* (2009.01)
 *G06F 21/62* (2013.01)
 *H04L 29/08* (2006.01)
 *H04M 3/42* (2006.01)
 *H04M 3/436* (2006.01)
 *H04W 4/60* (2018.01)
 *H04W 4/12* (2009.01)
 *H04W 4/02* (2018.01)
 *H04W 4/029* (2018.01)
 *H04W 4/90* (2018.01)

(52) U.S. Cl.
 CPC .............. *H04L 67/10* (2013.01); *H04L 67/26* (2013.01); *H04L 67/327* (2013.01); *H04M 3/42017* (2013.01); *H04M 3/436* (2013.01); *H04W 4/16* (2013.01); *H04W 4/60* (2018.02); *H04M 2203/551* (2013.01); *H04W 4/02* (2013.01); *H04W 4/027* (2013.01); *H04W 4/029* (2018.02); *H04W 4/12* (2013.01); *H04W 4/90* (2018.02)

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 2005/0195802 A1 | 9/2005 | Klein et al. |
| 2007/0165554 A1 | 7/2007 | Jefferson et al. |
| 2009/0186596 A1 | 7/2009 | Kaltsukis |
| 2010/0316205 A1* | 12/2010 | Zheng .................. H04M 1/575 379/142.1 |
| 2010/0322391 A1 | 12/2010 | Michaelis et al. |
| 2011/0225238 A1 | 9/2011 | Shaffer et al. |
| 2012/0054288 A1* | 3/2012 | Wiese .................. G06Q 10/10 709/206 |
| 2012/0264409 A1 | 10/2012 | Geyer et al. |
| 2013/0346524 A1* | 12/2013 | Barlow .................. H04L 51/00 709/206 |

* cited by examiner

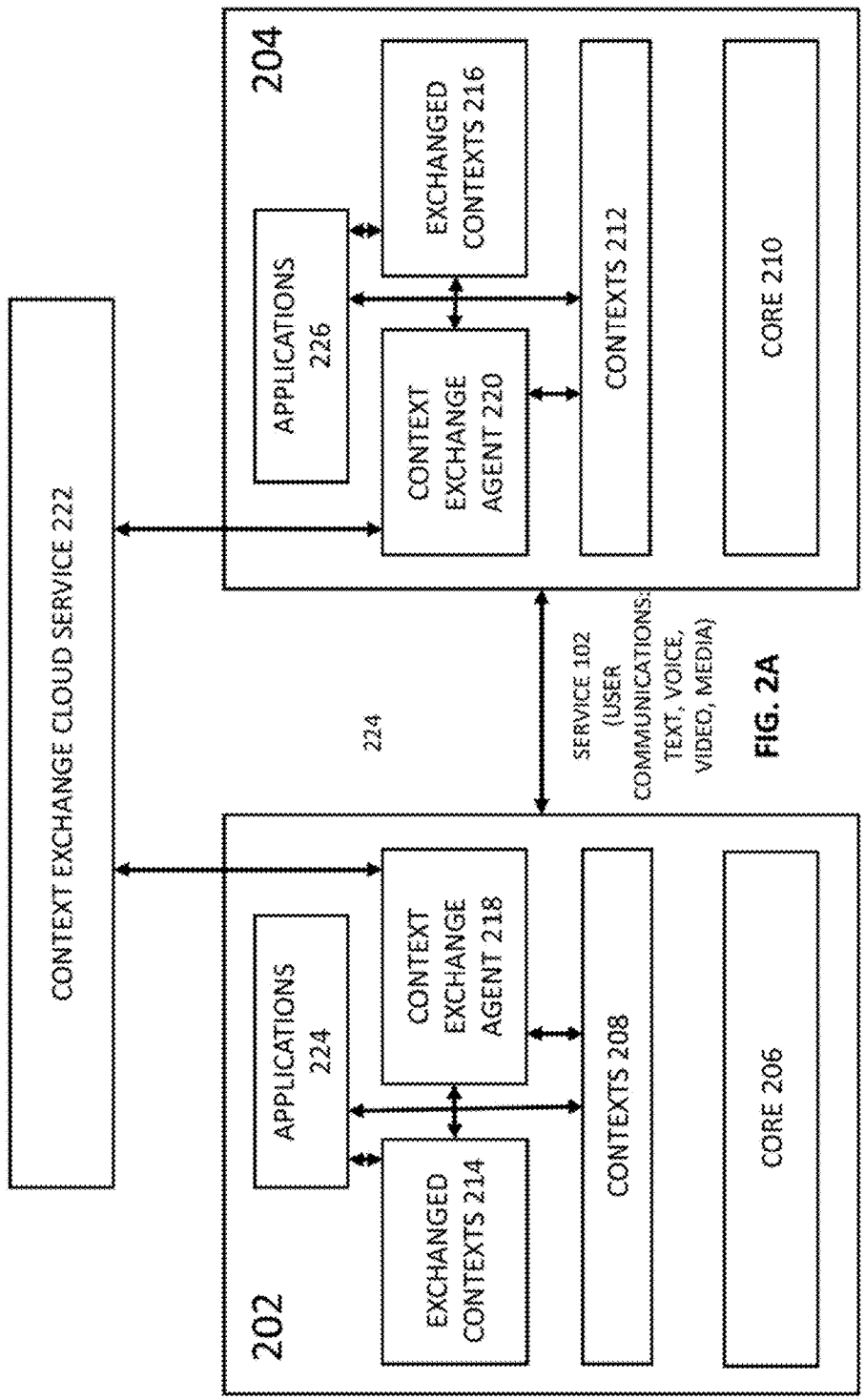

SECURE CONTEXT SHARING FOR PRIORITY CALLING AND VARIOUS PERSONAL SAFETY MECHANISMS

PRIORITY DATA

This Application is a National Stage application under 35 U.S.C. 371 of International Application PCT/US14/72321 filed on Dec. 24, 2014 and entitled SECURE CONTEXT SHARING FOR PRIORITY CALLING AND VARIOUS PERSONAL SAFETY MECHANISMS, which claims priority to an Indian Provisional Patent Application Serial No. 32/CHE/2014, filed on Jan. 3, 2014 and entitled PERSONAL SAFETY MECHANISMS POWERED BY WEARABLE AND HANDHELD SYSTEMS. The disclosures of the prior applications are considered part of and are incorporated by reference in the disclosure of this application.

TECHNICAL FIELD

This application relates to the field of computing, and more particularly to wearable and handheld computing.

BACKGROUND

Portable electronic devices are universal. Besides mobile phones, many people have smart phones, tablets, ultrabooks, laptops, electronic book readers, media players, video gaming consoles, health/fitness monitoring devices, etc. Even more interesting is that wearable computing is an exploding at a rapid pace. Wearable technology is related to both the field of ubiquitous computing and the history and development of wearable computers. Example of wearable devices include glasses, watches, clothing, accessories, anything wearable on a living being and in some cases devices implantable on a living being. In some cases, the electronic device is at least in part implantable on a living being, e.g., healthcare-related electronic devices. With ubiquitous computing, portable and wearable technology share the vision of interweaving technology into the everyday life, of making technology pervasive and interaction frictionless.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a block diagram illustrating a high level architecture of context exchange across devices, according to some embodiments of the disclosure;

DETAILED DESCRIPTION OF EMBODIMENTS

Figure 1:
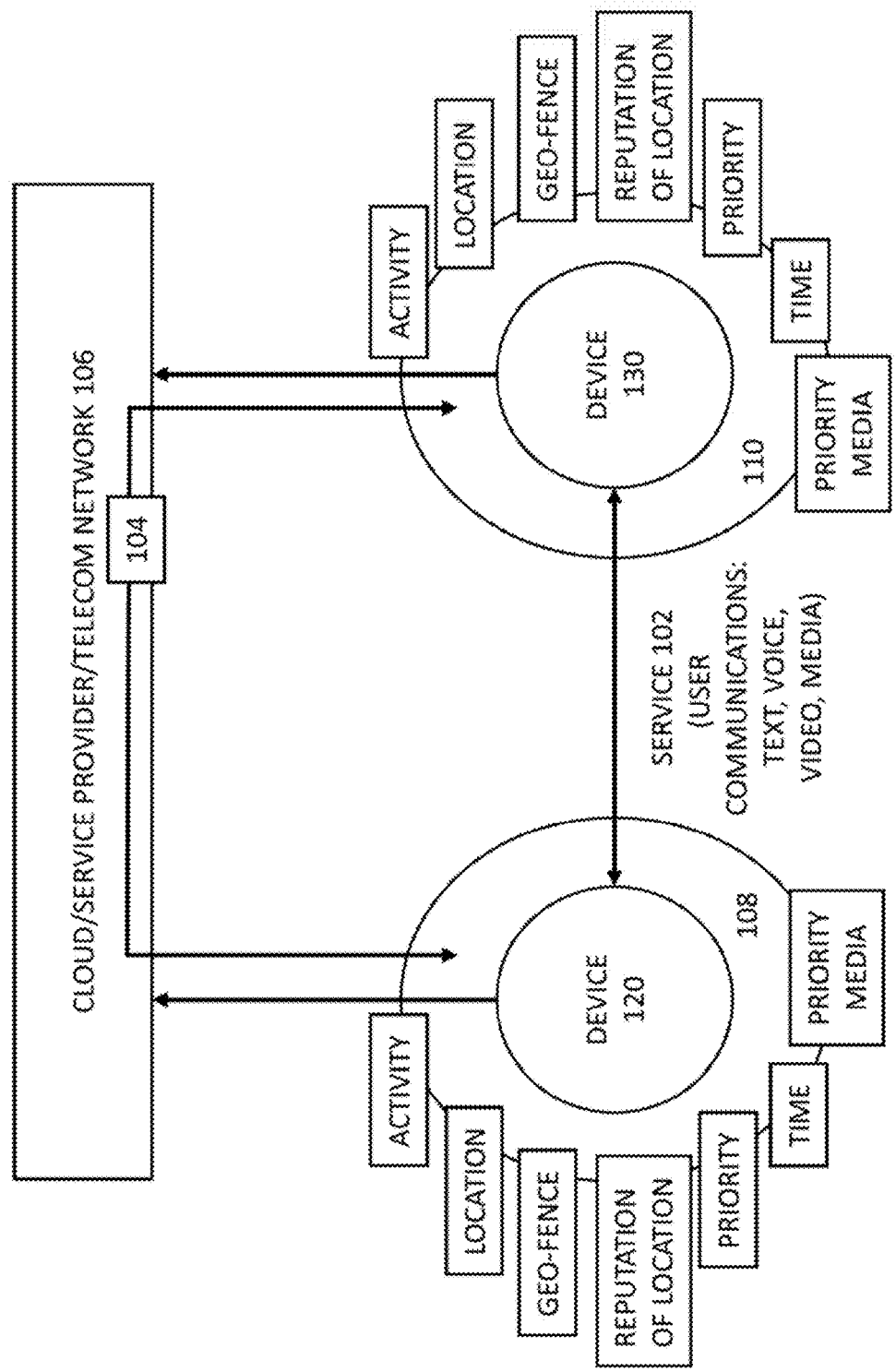
FIG. 1 is a block diagram illustrating the context of service, according to some embodiments of the disclosure.

Understanding Modern Electronic Communications with Electronic Devices

Portable and wearable electronic devices are generally electronic devices which are ubiquitous, pervasive, interactive, and interwoven into everyday lives of its users. As mentioned above, examples of wearables (short for "wearable devices") include glasses, watches, clothing, accessories, and any electronic device wearable on a living being or carried by a living being. Many of these electronic devices are being used to allow users to communicate with each other. For example, users can transmit text messages, multimedia messages, and emails, to each other with ease, users can make voice or even video calls with each other.

With the increased complexity of calling devices and relevant call suppressing applications, it is getting increasingly difficult to differentiate between a regular incoming communication and an important incoming communication. When the incoming communication is an incoming call, the receiver would typically see the name (if present in contact book) and number of the calling person, there is usually no other information related to the call. Also if the receiver's phone is in silent mode, the call can be missed irrespective of the urgency of the call. An "extremely urgent" and a "how-about-a-coffee" call can look the same at the receiver's end prior to picking up the call. As a result, a call with priority could be missed or ignored. This issue stems from the lack of information about the call when the receiver receives the incoming communication, and in some situations, the lack of context information being conveyed with user communications could greatly affect personal security.

It is not uncommon these days where personal security is compromised with consequences varying in degree from financial loss to physical harm to psychological scars. Many user studies have indicated that safety is one of the top concerns that impact quality of life. The issue is even more present in emerging countries where safety systems such as 911 are less organized or non-existent. Moreover, the complexity of modern life also implies that daily routines are often complex and can often require much coordination among family members. For example, being stuck in traffic, frantically trying to reach the spouse busy in meetings to ask the spouse to pick up a child from the school is a frequently occurring scenario for a user. The quality of life improves significantly, if the users can manage these "priority" situations in a much easier way, and be able to convey context information with user communications.

Understanding Context Information that Electronic Devices can Collect

As explained above, users often find themselves not being able to convey the priority of a call. If context information (e.g., indicating priority level) is also conveyed with user communications, a receiver can easily determine the priority and urgency of a call just by looking at the incoming call screen. Even if the phone is in silent mode, the receiver can be informed of an urgent call and be able decide whether to pick a call just by looking at the incoming call screen.

Besides indicating priority level (e.g., low, medium, or high), context information can include a variety of other types of information. Generally, context information provides supplemental information about a user communication, e.g., about an electronic device, and about a user using an electronic device. The context information can often assist a receiver or users who are trusted to receive the context information in making more informed decisions on whether to pick up a call. Examples of context information can include one or more of the following: sensor measurements that can be made with the electronic device, user-provided information/message, and derived information that is generated based on the context information provided by the electronic device and/or the user. Specific examples of context information can include one or more of the following:

- priority information (e.g., with varying priority levels),
- location information (e.g., global positioning system coordinates, city, neighbourhood, distance information, elevation, etc.),
- geo-fence information (e.g., distance from geo-fence, indication whether electronic device is within or outside of geo-fence, identifier for a geo-fence, et.),
- reputation of location information (e.g., accuracy of location information, last updated time, identifier of device which measured the location information, mechanism of how the location information is measured, etc.),
- biometric information (e.g., heart rate, blood oxygen levels, user movement or activity level, number of steps walked/ran, blood pressure, body temperature, sweat level, etc.),
- time information (e.g., timestamp, time of day, day of the week, date, year, season, etc.),
- activity information (e.g., gyroscope measurements, accelerometer measurements, proximity sensor measurements, light sensor measurements, environmental sensor measurements, distance of electronic device travelled, state of the electronic device (e.g., battery level, network connectivity availability/strength), etc.), and
- priority media content (e.g., content associated with priority user communication, intent of the priority user communication, supplemental information about the priority user communication, text, image, audio clip, video clip).

Portable and Wearable Devices are Particularly Advantageous for Collecting and Processing Context Information The electronic device can make measurements to collect the context information and/or process the measurements to derive context information. In many cases, the electronic device can provide interfaces to collect user input having context information, e.g., selection of priority, user input text, image capture, etc. As sensor-rich and always-connected electronic devices become more affordable every day, electronic devices are growing more capable in collecting context information of the electronic device and/or users using the electronic devices. The context information can help distinguish the priority level, as well as provide information that can assist users in avoiding or responding to situations, e.g., where personal safety could be compromised, or where high priority user communication can improve the quality of life.

Besides collecting context information, the devices can help immensely with obtaining quick access to facilities, maps, as well as contacting the other users, by offering a variety of applications that can generate meaningful displays for conveying the context information. Network connectivity of these electronic devices can then provide the means to allow users to communicate with each other, and if needed, allowing users to easily mobilize the help as needed. For instance, the portable and wearable electronic devices significantly boost this opportunity by providing a discrete yet powerful means to provide personal safety and improve the quality of life. The portable and wearable devices are also attractive for collecting context information and improving user experience since they are closer to the body of the user and usually within the reach of the user.

To accommodate the use of context information, the electronic devices and systems herein may address two interrelated technical challenges: (1) how to securely share/exchange context information, (2) how to process the context information on an electronic device to make effective use of the context information.

Sharing and Exchanging Context Information in an Out-of-Band Channel

Many electronic devices are already equipped with applications for allowing two electronic devices to transmit and receive user communications, e.g., text messages, voice calls, video calls, etc. However, these electronic devices do not provide a mechanism to allow context information to be shared. To avoid interfering with the existing applications used for transmitting and receiving user communications, the present disclosure describes solutions which provisions an out-of-band channel for transmitting and receiving context information. The out-of-band channel would be a channel that is separate from channels on which user communications would occur.

FIG. 1 is a block diagram illustrating the context of service, according to some embodiments of the disclosure. In many cases, a service 102 provides a channel for user communications, e.g., text messaging, voice calls, multimedia messages, video calls, etc. Separately, context of service can coexist with the service. The context of service can be viewed as the context that surrounds the service. Specifically, FIG. 1 shows two devices—Device 120 could be a wearable device, while Device 130 could be a smartphone, as an example. The figure shows context generators 108 and 110 (denoted by the outer circles surrounding Device 120 and Device 130), which can collect, manage, and/or provide the context information of the respective devices. Context generators 108 and 110 for the devices can be different for different devices depending on their capability. The FIGURE shows some examples of context information which can be collected for Device 120 and Device 130 by context generator 108 and 110 respectively.

The service 102 as shown in the figure could be any interaction between the two devices directly, via cloud, or via a telecom provider network (e.g., cloud/service provider/telecom network 106). Irrespective of the path, the service 102 facilitates device to device interactions and user communications. A voice call would be one such example service, where Device 120 is connected to Device 130 via telecom provider service for the purpose of a voice call. The service could also be an interaction of the device directly with cloud service, service provider, or telecom provider.

It can be seen that the context of service can be shared between Device 120 and Device 130 leveraging the cloud/ service provider/telecom network 106, e.g., via path 104. Specifically, an out-of-band communication channel via path 104 can be setup, e.g., through a context exchange cloud service, to allow exchange of context information between Device 120 and Device 130. Furthermore, the context exchange can be configured to deliver significantly enhanced experience in a variety of scenarios (e.g., priority user communications, personal safety, family/friends coordination, etc.). The context exchange can be unidirectional/ bidirectional, discrete/continuous, and online/offline. The use of exchanged context (in some cases, also leveraging the context of the receiving device) can significantly enhance the experience of the user of an electronic device.

In some examples, the disclosed systems and methods use the context information exchanged between devices to enhance personal safety of the users on Device 120 and Device 130, e.g., when one of the devices is a wearable device. In some embodiments, the quality of life of the users on Device 120 and Device 130 is improved by using the context information exchanged between the devices. These enhancements leverage existing services and applications as much as possible, while substantially not affecting those existing services and applications. As an example, the priority call discussed herein, does not require changes to the voice call service by the telecom provider, but significantly enhances the experience overlaying context information during the service.

Some solutions for personal safety tend to be focused on emergencies, where an application is created for the user to easily trigger communication with a family member. However, not all scenarios require an emergency, but other context information is to be shared (e.g., priority, intent, etc.). In those emergency applications, an emergency call could be accomplished by launching an application and/or by pressing a special button. The caller's location might be communicated to the receiver in some cases. It is noted that the present disclosure describes a variety of context exchange mechanisms, besides providing priority calling. For instance, one feature includes a mechanism for continuous contextual monitoring and communication to, e.g., ensure every day safety or coordination between users. Another feature can include a mechanism to build context-aware applications that help family and friends to better communicate with each other, and/or automatically and continuously monitor each other's safety and automatically trigger communication so that unsafe situations are prevented.

Overview of Applications Enabled by Context Information Sharing

Many scenarios can leverage context information to significantly enhance personal safety of the user by intelligent use of context exchange between two electronic devices, e.g., wearable device, smart phone, etc. These capabilities work well especially with wearable devices interacting with other types of family devices such as phones and tablets. The capabilities include:

Priority calling: An ability to securely connect caller and receive with simultaneous but separate voice and context channels. This embodiment can advantageously let the called user know not just who is calling, but also 'why' they are calling, even if the phone is silent.

Follow me: Such feature can help two individuals, as in two friends, shadow each other to ensure each other's safety by letting the friends continuously share context information.

Virtual presence: Such feature can help in immersive experience to ensure mutual safety with context exchange of all available contexts from location to camera to pulse data.

Family view: Such feature can provide one-click view of the context of all members in the family to provide peace of mind and one-click mechanism to communicate with each other. This is facilitated with context exchange from many devices to 1 device or broadcast depending on the application.

Traditionally, personal safety solutions tend to be limited to a) those that enable easy triggering of emergency—by way of consecutive calls to selected loved ones, providing location, nearby hospitals etc., and b) those that provide map of unsafe areas derived from public crime databases. The notion of geo-fencing has been used as a means to demarcate, typically, circular area and trigger alerts when the device enters or exits the fence. Embodiments described here may go beyond simple emergency notifications, the rich context information can provide a mechanism for families and friends to communicate effectively with context, and/or ensure each other's safety and to prevent unsafe situations in every day scenarios. One of the aspects of the embodiments described herein is the creative sharing of context to enhance the quality of communication between and to ease the coordination among trusted users (e.g., family members) independent of the form factor of the device they own. The result can help in significantly improving personal safety, by preventing potentially unsafe areas and situations, requesting or triggering help, and providing response and assistance to help the loved ones.

System Level Architecture

FIG. 2A is a block diagram illustrating a high level architecture of context exchange across devices, according to some embodiments of the disclosure. In particular, the FIGURE shows context exchange across devices coexists with the channel that offers a service 102 between the electronic devices 202 and 204 for exchanging user communications. An electronic device (e.g., electronic device 202 and 204), for the sake of clarity, is partitioned into a core and contexts. Core of the device is abstracted to including the hardware and operating system, except for various context-related applications. Contexts represent context information of the device, the user using the device, and/or the environment surrounding the device. Electronic device 202 thus includes core 206 and contexts 208 (comprising context information associated with electronic device 202); electronic device 204 includes core 210 and context 212 (comprising context information associated with electronic device 204).

To share contexts, preferably over an out-of-band channel, content exchange agent 220 can transmit context information of contexts 212 to the content exchange cloud service 222, and a context exchange agent 218 can receive the context information associated with electronic device 204 from context exchange cloud service 222. The context information received at electronic device 204 can be stored as exchanged contexts 214. Similarly, content exchange agent 218 can transmit context information of contexts 208 to the content exchange cloud service 222, and a context exchange agent 220 can receive the context information associated with electronic device 202 from context exchange cloud service 222. The context information received at electronic device 204 can be stored as exchanged contexts 216. To facilitate the exchange of context information, the context exchange cloud service 222 is provided, which is typically remote from electronic devices 202 and 204. The context exchange cloud service 222 can be implemented as a service in a cloud computing infrastructure.

The contexts of a device (e.g., contexts 208 and contexts 212) can be enhanced and combined with exchanged contexts from other devices (e.g., exchanged contexts 214 and exchanged contexts 216) if desired. Such processing can be performed by context exchange agent (e.g., 218, 220) to generate enhanced contexts based on contexts of a particular electronic device and contexts received from other devices. The exchanged (or received) contexts can also be used on their own. Generally speaking, the exchanged contexts (e.g., 214, 216) are obtained by the electronic devices (e.g., 202, 204) via a context exchange agent (e.g., content exchange agent 218 and content exchange agent 220).

Electronic device 202 can further include applications 224, and electronic device 204 can further include applications 226. Applications 226 can include applications which facilitate the service between the devices, i.e., user communications, potentially via a service provider network. Applications 226 can include applications which processes context and/or exchanged contexts. These applications can leverage either or both the exchanged contexts and contexts of the respective devices.

Preferably, applications for facilitating the service and underlying functions are not modified to process contexts, but the context information is provided or delivered to the user through means of graphic/image overlays using the applications specialized for processing the context and/or exchanged contexts. A special application (e.g., part of applications 224 and 226) executable using the core 206 and core 210 of the electronic devices 202 and 204 respectively can be provided specifically to offer this feature of processing the context information and providing the context information to the user without significantly affecting the existing service applications.

System Overview: Context Exchange Cloud Service

The context exchange cloud service 222 provide many functions. One function is to offer a communication channel (out-of-band with respect to the service channel for user communications). The context exchange cloud service 222 can manage many of these channels among many users of the context exchange cloud service 222. Another related function is to manage the users and the users that particular users has approved, thus securing the communication channels to allow only authorized context information exchange to occur. Yet a further function is to manage and process context information, if the context exchange cloud service provides an application to enrich the context information collected from various devices to derive further context information (e.g., based on policies or filters applicable to context information).

Figure 2B:
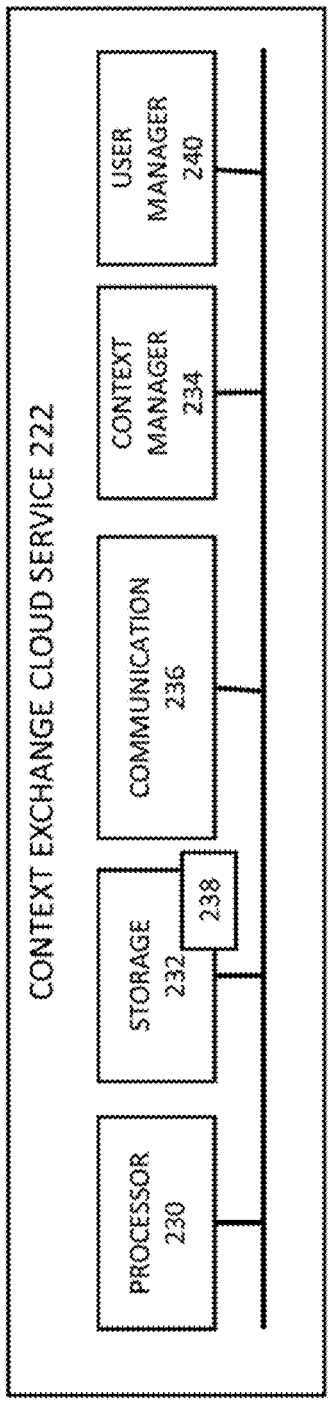
FIG. 2B is a block diagram illustrating components of a context exchange cloud service, according to some embodiments of the disclosure.

FIG. 2B is a block diagram illustrating components of a context exchange cloud service, according to some embodiments of the disclosure. The context exchange cloud service 222 can be embodied as a service that is implemented in a cloud infrastructure comprising one or more computer clusters. The computer clusters can include groups of remote servers are networked to allow electronic devices (e.g., 202 or 204) to access centralized data storage, computer services or resources, communication channels, such that context information being exchanged between many devices among groups of trusted users. As an example, context exchange cloud service 222 can include one or more processors 230, one or more storage elements 232, communication interface(s) 236, context manager 234, and user manager 240.

The one or more processors 230 and the one or more storage (memory) elements 232 make up the hardware elements that support the functions of the context exchange cloud service 222. Communication interface(s) 236 provide the network connectivity for allowing electronic devices (e.g., 202 or 204) to communicate with the context exchange cloud service 222. Furthermore, communication interface(s) 236 can be configured to provide communication channels among trusted users to share context information. The one or more storage elements 232 is operable to store electronic code, and the processor would be operable to execute instructions associated with the electronic code to, e.g., provide functions of the context manager 234 and user manager 240.

The context manager 234 can store and/or process of context information received from various electronic devices. For instance, context manager 234 may store a database 238 of context information associated with different users and/or electronic devices in the one or more storage elements 232. The context manager 234, if desired, can process the context information according to one or more filters and/or policies to generate derived context information (which can be subsequently shared with to electronic devices).

User manager 240 can implement user access control functions, e.g., maintain access control lists, etc. Data associated with user management can be stored in storage 232. In some embodiments, users can control who may have access to his/her context information. Access control can be particularly important because context information can often include sensitive, personal data. Electronic devices (e.g., 202 or 204) can cooperate with user manager 240 to request/allow/disallow sharing of context information with certain individuals. Electronic devices (e.g., 202 or 204) and users of such electronic devices can perform authentication and/or authorization functions with user manager 240 for security purposes. Upon authentication/authorization, the user manager 240 can trigger proper communication channels to be configured for sharing context information among trusted users.

System Overview: Electronic Device

Figure 2C:
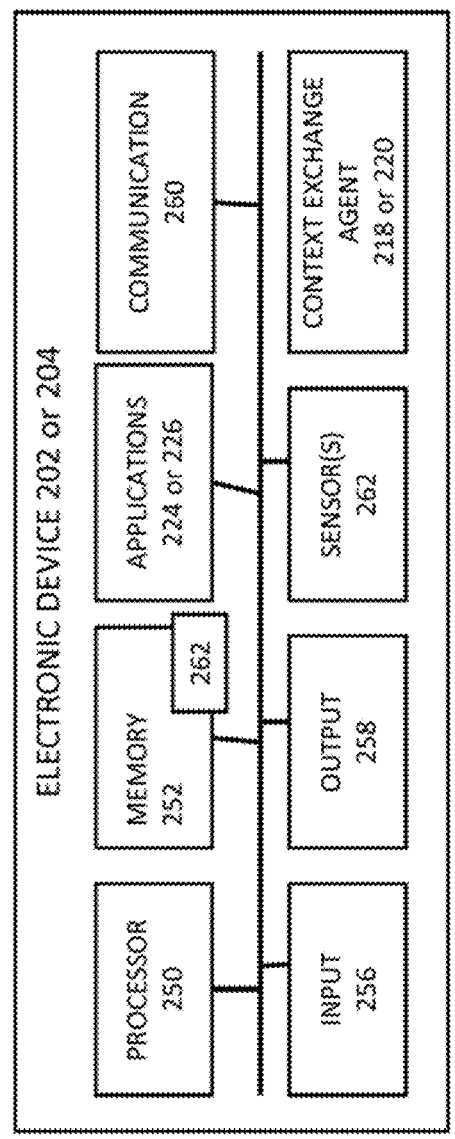
FIG. 2C is a block diagram illustrating components of an electronic device, according to some embodiments of the disclosure.

The electronic device (e.g., 202 or 204) can (1) provide a service which allows user communications to be made between electronic devices, and (2) provide context exchange capabilities to allow context information to be collected and shared. FIG. 2C is a block diagram illustrating components of an electronic device, according to some embodiments of the disclosure. Usually, the electronic device is a portable electronic device or a wearable electronic device, but the electronic device can include other suitable types of consumer electronic devices as well (e.g., desktop computers, household electronics, etc.). The electronic device (e.g., 202 or 204) can include one or more processors 250 (e.g., digital signals processor, etc.), one or more memories 252, various applications (e.g., 224 or 226), communication interface(s) 260, (optionally) input part 256, (optionally) output part 258, (optionally) one or more sensors 262, and context exchange agent (e.g., 218 or 220). Various parts of the electronic device can be communicably connected with each other over a communication bus or a connectivity fabric/network of wires.

As explained previously, the applications (e.g., 224 or 226) can include applications that provide a service for exchanging user communications, as well as applications that can process context information and output the context information to the user. Broadly speaking, the one or more memories 252 is operable to store electronic code, and the one or more processors 250 is operable to execute instructions associated with the electronic code, such that the electronic device can carry out any one or more functions described herein. Furthermore, the one or more memories 252 can store context information 262 (or derivations thereof) of the contexts of a particular electronic device or exchanged contexts from other electronic devices.

The communication interface(s) 260 can include a communication stack that allows the electronic device (e.g., 202 or 204) to communicate with one or more other electronic devices. For instance, the communication interface(s) 260 can provide cellular network connectivity to allow for voice calls between electronic devices, or network connectivity to transmit messages, etc. Furthermore, the communication stack can allow the electronic device (e.g., 202 or 204) to communicate with the context exchange cloud service (e.g., 222), for example, via the Internet and/or a cellular network.

Depending on the electronic device (e.g., 202 or 204), the input part 256 may include one or more user input devices such as an imaging device, gesture sensor, light sensor, microphone, buttons, keypad, touch-sensitive display, scroll wheel/ball, etc. The input part 256 can be used for collecting context information (from the user).

The output part 258 can include one or more user output devices such as an electronic display, haptic output (e.g., vibration, programmable movable surfaces), speaker, etc. The output part 258 can output context information to the user.

The sensor(s) 262 can include one or more sensors such as a capacitive sensor, light sensor, global positioning system sensor, antenna, magnetic sensor, accelerometer, gyroscope, compass, moisture sensor, humidity sensor, pressure sensors, etc. Such sensor(s) 262 can be used for collecting context information as well.

Overview of Method for Receiving User Communications and Context Information

Figure 3:
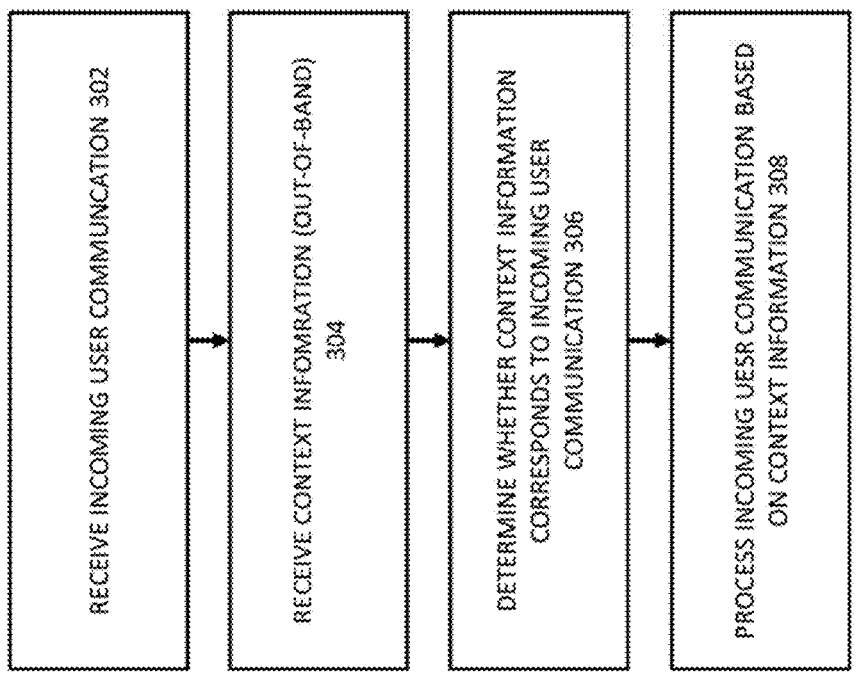
FIG. 3 is a flow diagram illustrating a method for receiving user communications and context information, according to some embodiments of the disclosure.

FIG. 3 is a flow diagram illustrating a method for receiving user communications and context information, according to some embodiments of the disclosure. The method can be carried out by an electronic device (e.g., 202 or 204). The electronic device may include an application for providing a service which allows for exchange of user communications, and an application for allowing exchange of context information.

The electronic device can be configured to receive a first incoming user communication from a second electronic device through a first communication channel (302). This electronic device is referred herein as the "receiver", for simplicity. This can include an incoming text message (e.g., Short Message Service (SMS) or Multimedia Message Service (MMS) message, email), or an incoming voice or video call, etc. The incoming user communication would have originated from another user on another electronic device (referred herein as the "caller" for simplicity, even though not all user communications are "calls"). Furthermore, the electronic device can receive the first context information from a context exchange cloud service through a second communication channel that is out-of-band with respect to the first communication channel (304). The first context information can include context information associated with the caller (the user or the electronic device). The receiver can then determine whether the context information corresponds to the first incoming user communication, so that the receiver can perform reactive functions to process the context information appropriately. In response to determining that the first context information corresponds to the first incoming user communication, the receiver can process the first incoming user communication based on the first context information. For instance, the receiver can generate an image overlay, output a notification, or change phone settings from "silent" to "loud ring tone", etc., to convey the context information associated with the first incoming user communication appropriately.

Registration and Secure Pairing Prior to Context Information Exchange

The embodiments disclosed herein generally includes mechanisms for secure pairing of the devices so that the exchange of context data is by permission only. In some embodiments, the electronic device can be provided to prior to receiving the first context information, receive, from the context exchange cloud service, a request requesting approval to allow context information associated with the user of the second electronic device to be shared with the first electronic device and/or to allow context information associated with the user of the first electronic device to be shared with the second electronic device. The electronic device, can, in response, transmit, to the context exchange cloud service, a response indicating the approval.

The mechanism to ensure mutual consent and permission can include a handshake mechanism. One mechanism could be as follows: Device 1 requests Device 2; a message sent to Device 2; User on Device 2 approves request; Acknowledgement received on Device 1; and stored in the cloud. As a result, users on Device 1 and Device 2 are allowed to exchange contexts. In some embodiments, the handshake mechanism can occur concurrently with receiving of the first context information. For instance, when Device 2 first receives the context information, the context information could embed a request to receive and/or share context information. The user of Device 2 could provide user input to allow the request.

Example: Priority Calling

Priority calling (or broadly, priority communication) is an example of enhanced experience and improved personal safety with the aid of context exchange or unidirectional transfer from one electronic device to another. Priority calling can be applicable in a situation where a child or spouse tries to call the user, when the user in important meetings with the smartphone in silent mode. The child or spouse would be frustrated and so would the user be when she/he discovers that they missed a very important call. The conventional voice calls fail to communicate "why" (or the context in which) the call is being made. Alternatives of manually transmitting an SMS message or email would not help as much, since they are passive, and the user has to manually relate them to the voice call.

Figure 4:
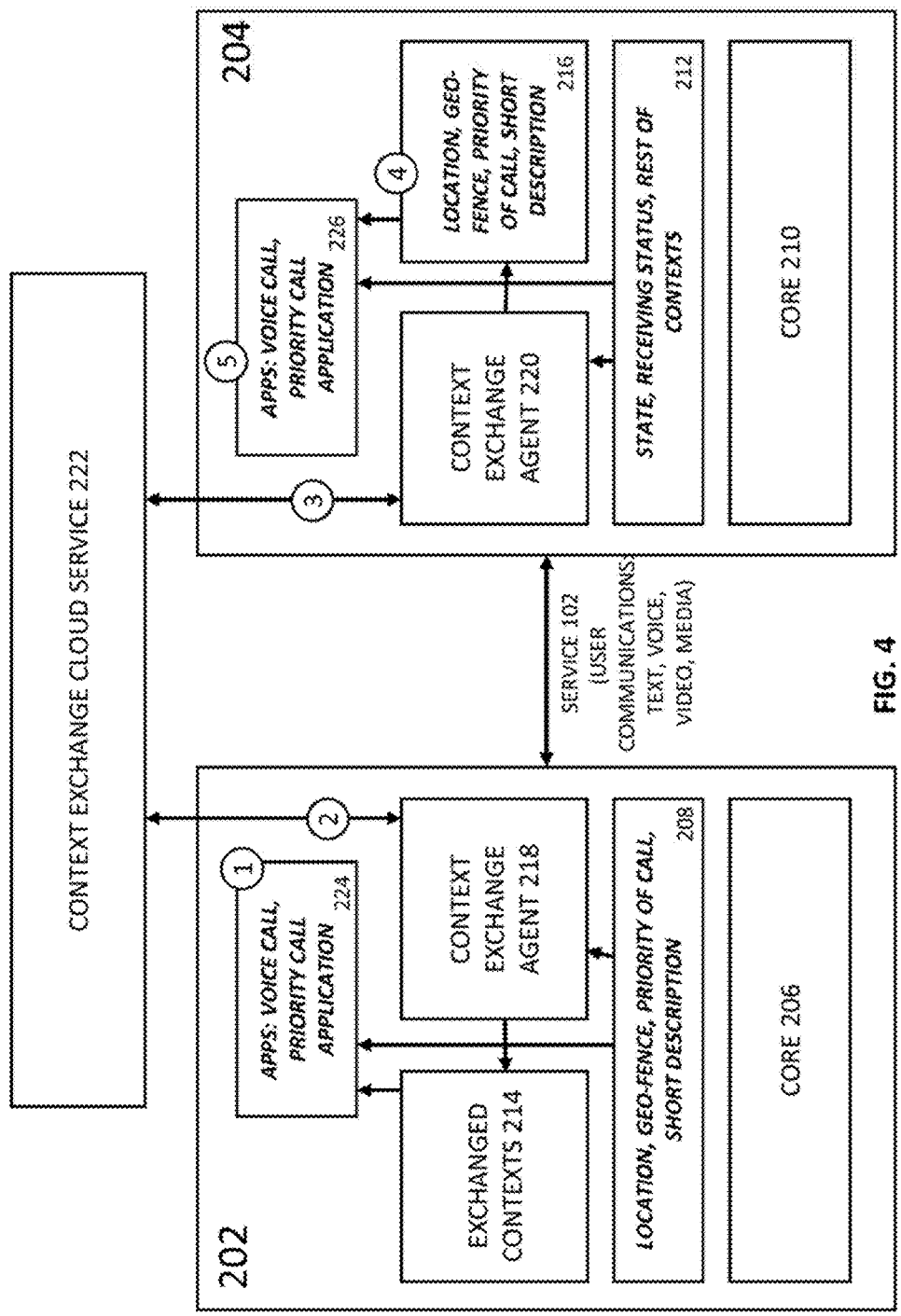
FIG. 4 is a block diagram illustrating the flow of information for priority calling, according to some embodiments of the disclosure.

FIG. 4 is a block diagram illustrating the flow of information for priority calling, according to some embodiments of the disclosure. The various parts of the flow of information and/or processes are denoted by markers shown as circles with numerals, and description below corresponds to the numerals. Priority calling from electronic device 202 to device 204 can be implemented using the context exchange cloud service 222. Priority calling utilizes two separate channels. A first channel (shown as service 102) is a voice channel using, e.g., the existing unmodified voice call application; a second channel is an out-of-band communication channel that allows for transfer of context information using, e.g., a specialized priority call application.

1. A priority call application (e.g., 224) can overlay (e.g., provided on top of, obscuring, overlap, etc.) an existing voice call application (e.g., 224), or can be integrated with the voice call application (in some cases the priority call application can replace the voice call application). The priority call application collects the context information in contexts 208 (e.g., priority level, further context information) when the user makes the priority call. Context information can include one or more of the following: location information, geo-fence information, priority of call, short description, etc.
2. Context exchange agent 218 can transmit the context information via context exchange cloud service 222 over the second (out-of-band) communication channel.
3. Electronic device 204, e.g., context exchange agent 220, receives context information from context exchange cloud service 222 over the second channel.
4. Electronic device 204, e.g., context exchange agent 220, stores the received context information as exchanged contexts 216.
5. Priority call application (e.g., 226) at electronic device 204 can wake up electronic device 204 to process the received context information (in exchanged contexts 216) and/or context information (of contexts 212), or priority call application (e.g., 226) can process the received context information. Based on the processing, the priority call application can configure settings of the electronic device 204 to set up distinctive ring tones, e.g., based on appropriate interpretations of the received context information.

In some embodiments, the priority call application (e.g., 226) can overlay the received context information over the call information, so that the user on electronic device 204 can learn 'why' the user on electronic device 202 is calling. The overlay advantageously allow the receiver to learn of the context even before he/she picks up the call. To convey the priority context information, a priority call application (e.g., 226) can generate appropriately prominent (based on context such as priority level) notification, if the user on electronic device 204 missed the call, so that when the user sees the notification, the user knows the context and appropriate action to take before even returning the call to electronic device 202.

Optionally, the context exchange agent 220 of electronic device 204 can also transmit certain context information (in contexts 212) to context exchange agent 218 of electronic device 202 (in response to receiving context information associated with electronic device 202 and/or the incoming user communication), over the second out-of-band communication channel. For instance, the context information can include one or more of the following: state information associated with the electronic device (e.g., sleep, low battery, etc.), receiving status (e.g., phone is on silent, call missed, call ignored, etc.), and any suitable context information such as location information, geo-fence information, biometric information, etc. In some cases, the context information associated with electronic device 202 being transmitted to context exchange agent 218 can be derived based on the contexts 212 and exchanged contexts 216 at electronic device 204.

In some embodiments, the electronic device 204 can determine context information associated with electronic device 204 (in contexts 212) and transmit context information associated with electronic device 204 to the context exchange cloud service 222 (over the second out-of-band communication channel). The context information cloud service 222 can then provide the context information associated with electronic device 204 to electronic device 202 (over the second out-of-band communication channel). The context information being transmitted from electronic device 204 to electronic device 202 can indicate to the user of the electronic device 202 whether the user on electronic device 204 received the call, if the user on electronic device 204 missed the call, or if the user on electronic device 204 consumed the notification of the priority call arriving on electronic device 204.

Graphical Representations of Priority Calling User Experience

Figure 5:
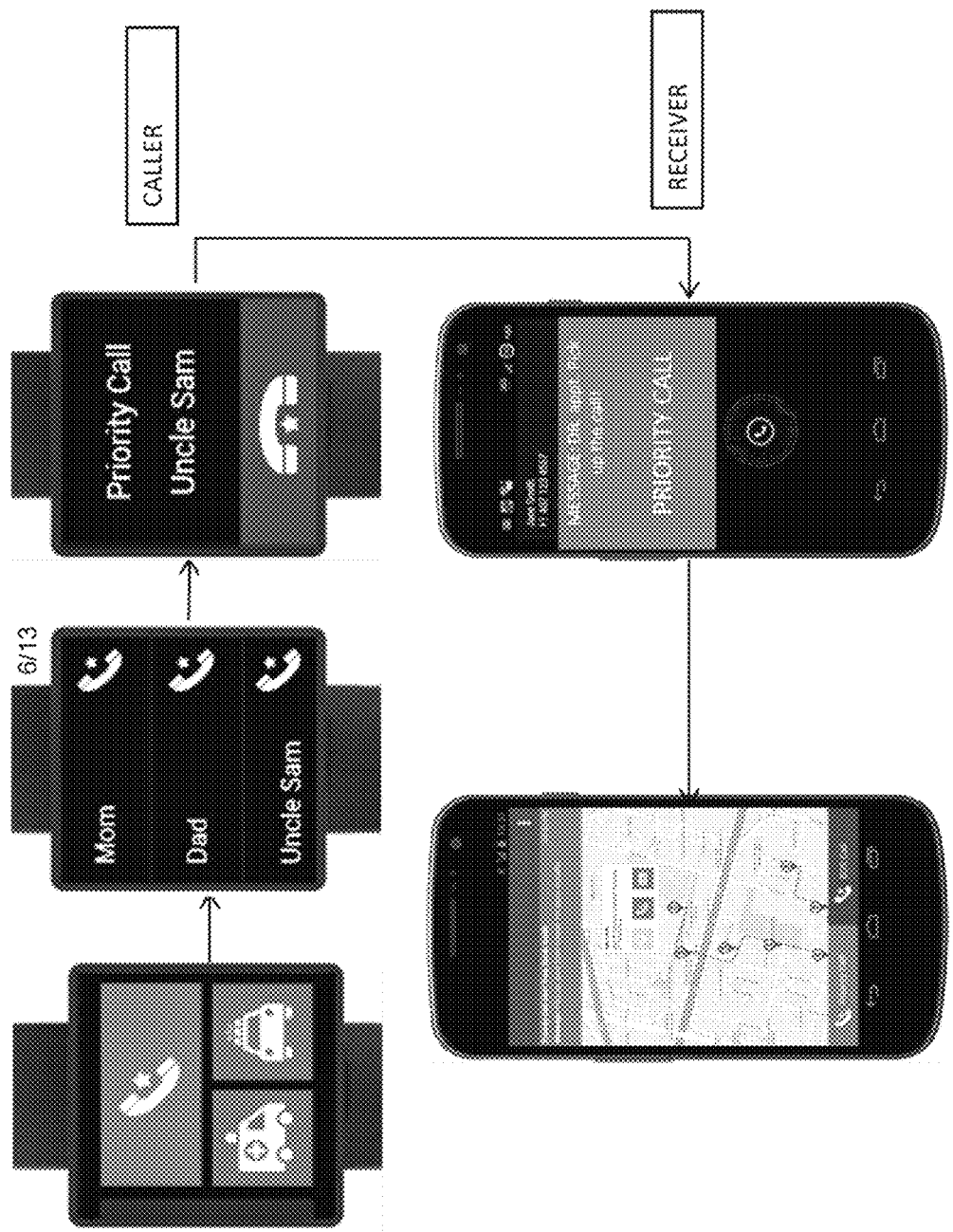
FIGS. 5-7 depict several graphical representations of a priority calling user experience, according to some embodiments of the disclosure.

FIG. 5 depict a graphical representation of a priority calling user experience, according to some embodiments of the disclosure. A user that is using a wearable electronic device is able to exchange context information with the receiver of the call. For instance, location information, geo-fence information, priority information, a message, and any other suitable information can be conveyed to the receiver. Specifically, FIG. 5 shows graphical representation of priority call experience of caller on a smart watch making a priority call to a receiver on a smartphone. Through the user interface on the smart watch, the caller can select a receiver, e.g., "Uncle Sam", and make a priority call by selecting the icon having the picture of a phone with a star and selecting "Uncle Sam" on the touch-sensitive display of the smart watch. When the user makes the priority call, the context information of the caller is determined or collected, and transmitted to the receiver via the context exchange cloud service over an out-of-band channel to the receiver. At the receiver, an overlay displays the context information, e.g., name of the caller ("Jane Smith"), a message ("DR. appt. Pick up the call!", and priority level ("PRIORITY CALL"). Another overlay (generated using a mapping application) can display the context information, e.g., name of the caller ("Sarah Smith"), a message ("Pick up Jane from school. I'm stuck in traffic"), and location history (path connecting past locations in the location history).

Figure 6:

FIG. 6 depicts a graphical representation of a priority calling user experience, at the receiver in particular, according to some embodiments of the disclosure. The priority calling application at the receiver can process the context information, and implement changes on the receiver accordingly. For instance, the priority calling application can configure a different ring-tone, or generate an overlay that can display the priority level ("Priority Calling . . . "), short message ("my car broke down"), and location information ("Domlur Flyover, Bangalore").

Figure 7:

FIG. 7 depicts another graphical representation of a priority calling user experience, at the receiver in particular, according to some embodiments of the disclosure. The priority calling application can trigger a mapping application to display the location information, location history, geo-fence information, etc., to notify that a priority call was received at the receiver. The mapping application can generate a map image visually showing a location, or a plurality of locations (e.g., based on the location history in the context information), and if desired, a path which connects the locations based on the ordering of the plurality of locations.

Example: Follow Me

Once an out-of-band communication channel is configured between two electronic devices, a further enhanced experience can be provided by allowing "continuous" monitoring and updating of context information among the two electronic devices (or more if desired). This usage, referred herein as "Follow Me" is an example of enhanced experience and improved personal safety with the aid of duplex (both directions) context exchange between two or more electronic devices over the established out-of-band channel. Context information for this example can include location information, history of location information (e.g., a plurality of location information), geo-fence information, etc.

Consider the common scenario of a friend visiting another friend in an urban area of an emerging country where the maps are not well populated/accurate or while trekking or other unfamiliar surroundings. Usually, the friends would have to exchange many calls on where they are, which direction to go next, effectively navigating each other on the voice. The friends would also go through much stress and wasted time. If the friends are driving, the exchanging of calls and messages can be dangerous and distracting.

"Follow Me", as an illustrative example, solves the problem using context exchange cloud service described herein. Once the out-of-band communication channel is configured, the users can leverage the context exchange agents on respective devices and the context exchange cloud service to maintain updated context information of each other. For instance, the context exchange agent of one electronic device can provide and/or configure the out-of-band communication channel as a push message channel for receiving further context information associated with the second electronic device from the context exchange cloud service. Advantageously, up-to-date context information from the electronic devices are pushed to the context exchange cloud service, and the updated context information is pushed to other electronic devices over the out-of-band communication channel by the context exchange cloud service. The electronic devices would continuously receive up-to-date context information about other (trusted) electronic devices.

To share or exchange context information "continuously", an electronic device and/or the context exchange cloud service can configure the second communication channel as a push message channel for receiving further context information associated with other trusted electronic devices from the context exchange cloud service. Any new updates to the context information associated with other trusted electronic devices are pushed to the electronic device.

In some embodiments, the further context information pushed to a first electronic device comprises a plurality of location information associated with a second electronic device (e.g., representing a path that the second electronic device has taken. The first electronic device is further configured to generate, using a mapping application, a map image representing the plurality of location information and rendering the map image for display on the first electronic device. The user using the first electronic device can effectively "follow" the user using the second electronic device. Advantageously, "Follow Me" can use an existing mapping application on the electronic device to deliver a user experience which can output context information for the user. For instance, the mapping application can generate a display of locations of both electronic devices and any geo-fence information of the users on the display of either or both electronic device.

Example: Geo-Fencing, Policies, and Filtering of Context Information in Family/Friends/Group View For a richer and more complex experience, geo-fence information (provided as part of the context information) and/or predefined filters can be applied at the context exchange cloud service. Effectively, the context information exchanged via the context exchange cloud service can be processed by the context exchange cloud service to generate derived context information. The generation of derived context information can also be generated at the electronic devices themselves by merging the contexts of a particular electronic device with exchanged contexts.

For instance, a first electronic device may have context information which includes geo-fence information (e.g., a description of a particular area of interest). The geo-fence information can be managed by the context exchange cloud service, so that location information of contexts associated with other devices can be checked against the geo-fence information. Broadly speaking, the geo-fence information or other suitable context information can serve as one or more policies that can be used to process received/exchanged contexts. Once the out-of-band communication channel is configured, a first electronic device can receive context information which includes a notification that context information associated with a second electronic device received at the context exchange cloud service violates one or more policies (e.g., geo-fence, and other suitable policies).

In one example, the first electronic device having geo-fence information describing a particular area (e.g., as a policy) can receive a notification as context information of a second electronic device that the second electronic device has entered the particular area (e.g., by checking the location information of the context information associated with the second device against the geo-fence information of the context information of the first electronic device). Another exemplary policy specified in the context information of a first electronic device can include a rule for transmitting a notification if the location information of the second electronic device indicates the second electronic device is too far away from the location information of the first electronic device. Yet another exemplary policy specified in the context information of the first electronic device can include a rule for transmitting a notification and biometric information if the biometric information meets one or more criteria (e.g., unhealthy or dangerous levels).

The derived context information, e.g., the notification, can thus convey more complex information. Furthermore, the users can prevent an overload of context information by filtering out context information that is not salient using the one or more policies.

One exemplary usage, "family/friends/group view" (also referred as simply "family view"), is an enhanced experience and improved personal safety with the aid of duplex (both directions) context exchange between a first electronic device and further electronic devices in the group. Once the out-of-band communication channel is configured, duplex context information exchange can be provided for all the electronic devices. Context information being exchanged in the example of "family view" can include one or more of the following: location information, geo-fence information, pulse information, Bluetooth and WiFi scans, etc. The context information being shared can, in some cases, correspond to user communications being exchanged among the devices in the group (e.g., priority calling).

Working families have a very complex daily routine—working parents, active grandparents, separate schools, busy after-school activities. As the parents juggle even daily routines, it would be a relief to know everyone in the family is safe. Family/friends/group view can provide one or more of the following advantageous. Family/friends/group view can leverage an existing mapping application on the electronic device to deliver a user experience which can output meaningful context information for the user. For instance, the mapping application can generate a display of locations of both electronic devices and geo-fences of the users on displays of both electronic devices. The geo-fence information can enable automatic alerts or notifications indicating to the user when the friend is entering or close to potentially unsafe areas. Geo-fence information can enable alerts or notifications to be generated when geo-fence policies are broken. If a first electronic device defines in its context information that a fence A is unsafe for user on a second electronic device, the geo-fence information can prescribe that an alert be generated and communicated to both the user on the first electronic device and the second electronic device. It could serve the intent to help users avoid a very busy and potentially jammed section of the city or challenging downtown roads. The context information of the plurality of electronic devices can be continually updated as the devices/users move, e.g., via a push message channel as the out-of-band communication channel. In some embodiments, the mapping application can generate a map image which shows the history of location information, geo-fence information and other context information overlaid on the map. If needed, the electronic device can connect the two users automatically by other means such as voice as needed.

Figure 8C:
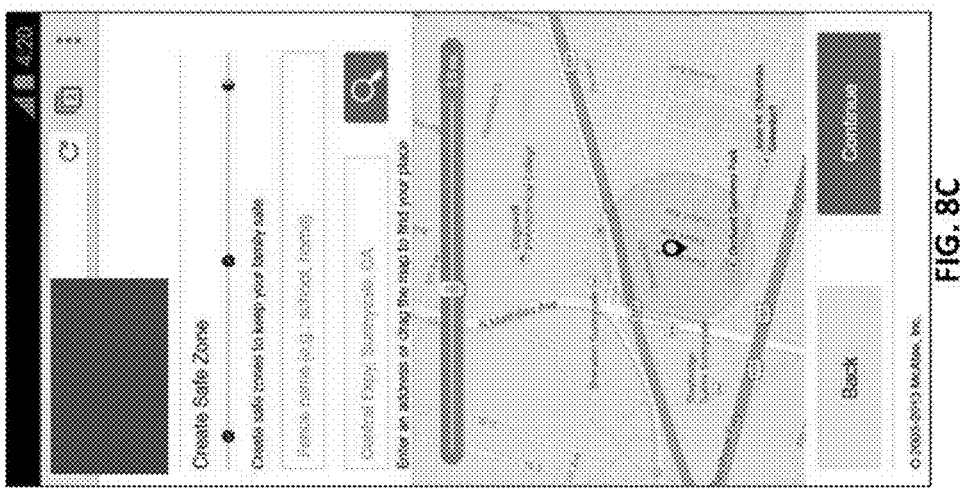
FIGS. 8A-D depict several graphical representations of a family view user experience, according to some embodiments of the disclosure.
Figure 8B:
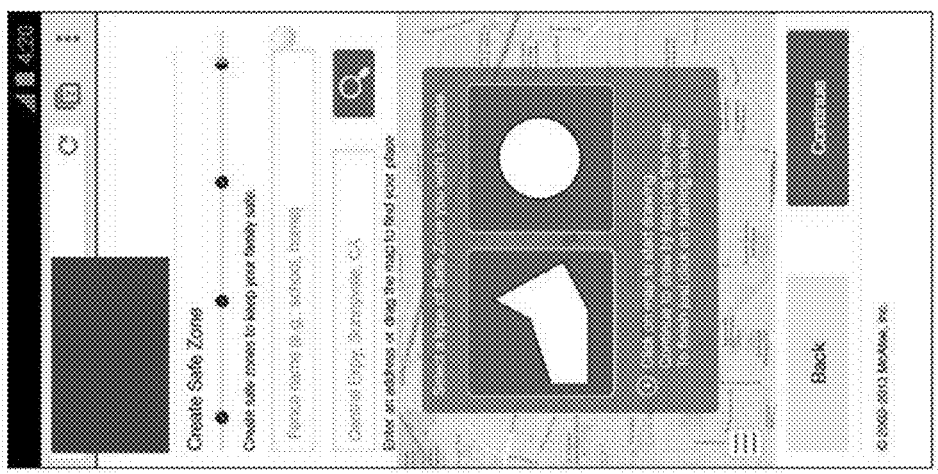
Figure 8A:
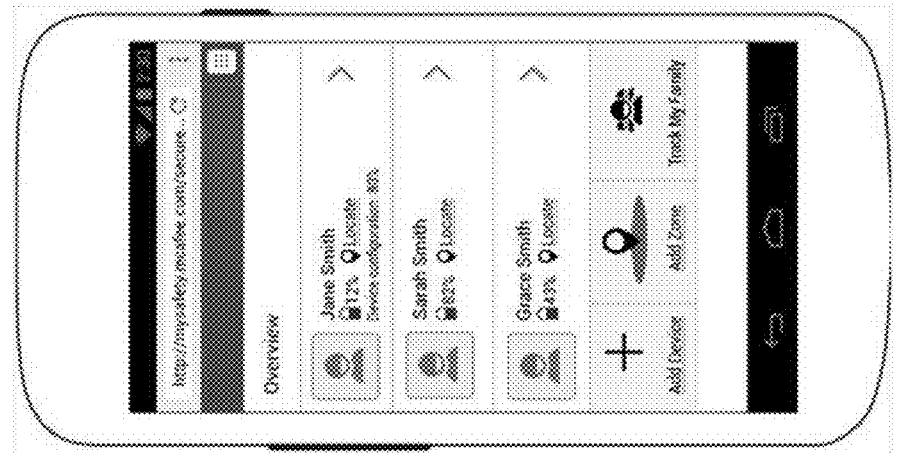
Figure 8D:
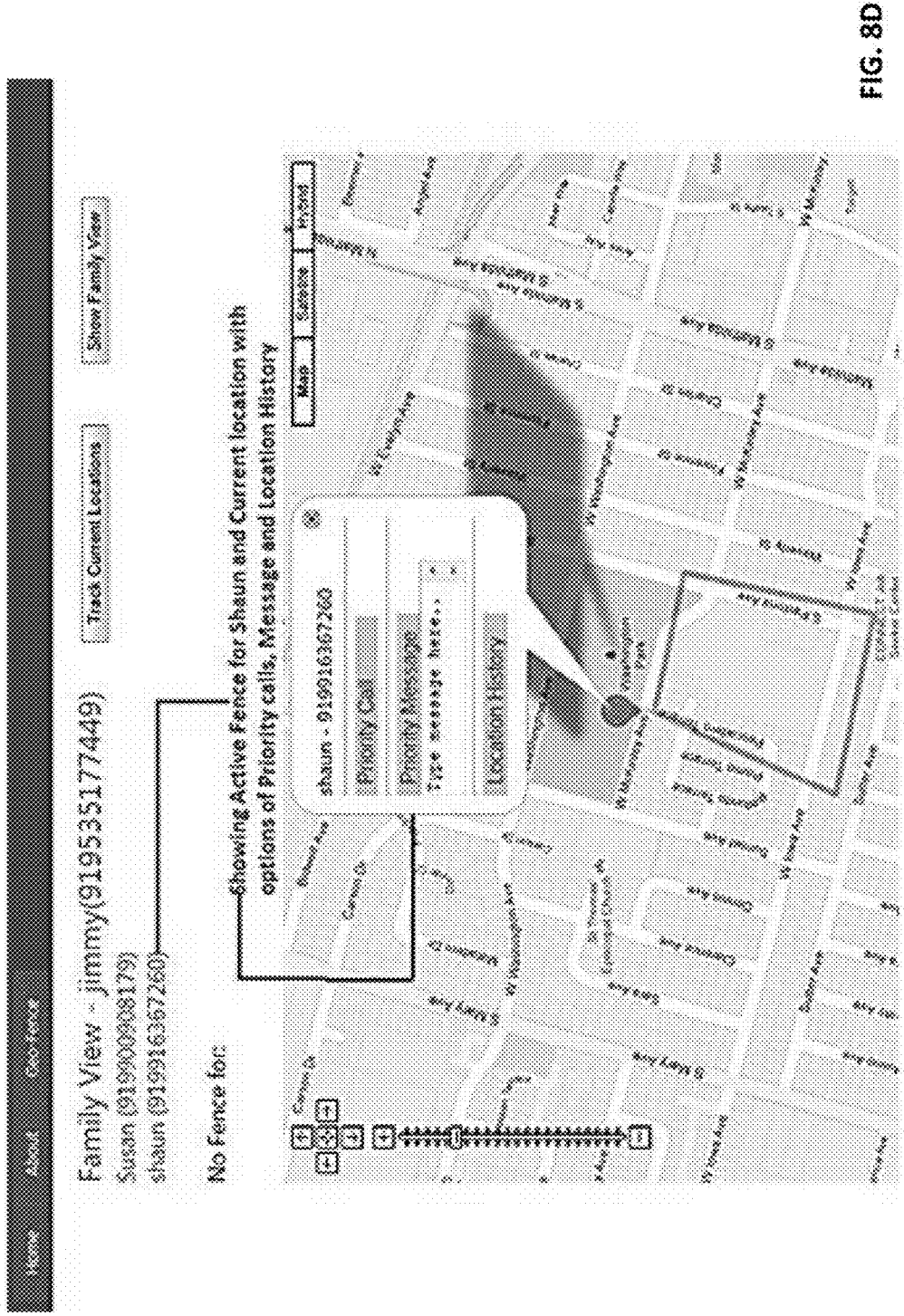

FIGS. 8A-D depict several graphical representations of a family view user experience, according to some embodiments of the disclosure. A user interface provides a way to allow users to monitor the location of various users (e.g., maintain up-to-date context information). For instance, FIG. 8A shows a user interface provided on a first electronic device, which can enable a user to monitor a list of users of the "family". In this user interface, context information associated with other electronic devices can be seen at-a-glance, including battery levels. FIG. 8B-C illustrate user interfaces which can allow the user of a first electronic device to create geo-fence information as context information. For instance, a geo-fence, shown herein as "a safe zone" can be created to define any filters, functions, or alerts based on whether another user is within the zone or outside the zone. FIG. 8D shows another view where an active geo-fence for the user Shaun is shown, and various possible priority communications can be made with Shaun. In one example, the context exchange cloud service, or the first electronic device determines the location information indicates that Shaun or his electronic device has entered the area of the active geo-fence, the first electronic device can receive a notification. In response, the user of the first electronic device can make a priority call to Shaun to warn him of the danger in the active geo-fence (e.g., providing a priority message as context information, alongside a voice call).

The following outlines illustrative processes involved in an exemplary use case of "family view" for tracking context information of N devices (e.g., Device 1 to N):

Device 1 can initiate to a family view. Family view can be triggered in response to a priority call being made to the Device 1. In some cases, an application on Device 1 can transmit a message to all other electronic devices (Device 2 to N) in the family to trigger the other electronic devices to enter tracking mode. Optionally, the other electronic devices (Device 2 to N) can prompt the user to request an acceptance by the user on those devices before tracking mode can be entered.

Devices 1 to N can record/collect available context information (depending on the device capability). Context information can include: location information, time information, geo-fence information, pulse reading or other biometric information, Bluetooth and WiFi devices nearby, etc. The context information is pushed from Devices 1 to N to the context exchange cloud service.

The context exchange cloud service can process and analyze the contexts. The processing or analysis can depend on the context information of Device 1. Example A: the context exchange cloud service can mapping location information of Device 2 to check to see if it inside or outside a geo-fence defined in the context information of Device 1. Example B: analyze heart rate to normal range specified by the user on Device 1, so on Communicate the derived context to an application on Device 1, e.g., push the derived context over the out-of-band communication channel to Device 1 from the context exchange cloud service.

Depending on the application on Device 1, the derived context could be rendered in an appropriate way, e.g., mapping of devices to a map; alerts based on geo-fences; alerts based on normal health range, so on.

The application on Device 1 can further enable device to device communication, if appropriate (or triggered by context information), e.g., advantageously enabling further priority user communications such as priority calling.

When Device 1 is not capable of voice (as an example), the application on device 1 can send a message to the nearest device (any one of Device 2-N) to call Device 2 (as an example).

The out-of-band communication channel can continue to serve as a communication channel to "continuously" push/share context information and the context exchange cloud service can continue to process/analyse the context information to generate derived context information.

Example: Virtual Presence

This usage is an example of enhanced experience and improved personal safety with the aid of duplex (both directions) context exchange between device 1 and device 2. Once the out-of-band communication channel is provisioned between a first electronic device and a second electronic device, context information can be exchanged to provide the functionalities of "virtual presence". Context information being exchanged can include one or more of the following: location information, geo-fence information, camera images, microphone audio, pulse monitor, Bluetooth and WiFi scans, Biometrics, etc. The context collection and exchange could be discrete or continuous. Virtual presence is where User 1 on Device 1 has access to all of the context information of User 2 on Device 2, and vice versa. With an underlying security framework, the context exchange cloud service can ensure that the devices are paired with mutual consent for sharing context information a secure (out-of-band) channel. With this full sharing of context information, users can get an immersion of the experience. As an example, parent and child could guide each other while separated in an amusement park. Using virtual presence, the parent and child can communicate better and ensure each other's safety. The recording capability can serve as a means to deter perpetrators and also serve as proof recording mechanism.

Priority Calling in Detail

Priority calling, as explained previously, provides a mechanism for to communicating the context of a call simultaneously over out-of-band communication channel and present it as a layer or overlay to the receiver. Configuring the out-of-band communication channel context information from caller's phone to the receiver's electronic device is not trivial. Preferably, the out-of-band communication channel allows the context information to be transmitted to the receiver, e.g., prior to the actual priority call being made over a first communication channel comprising a voice call channel.

Figure 9:
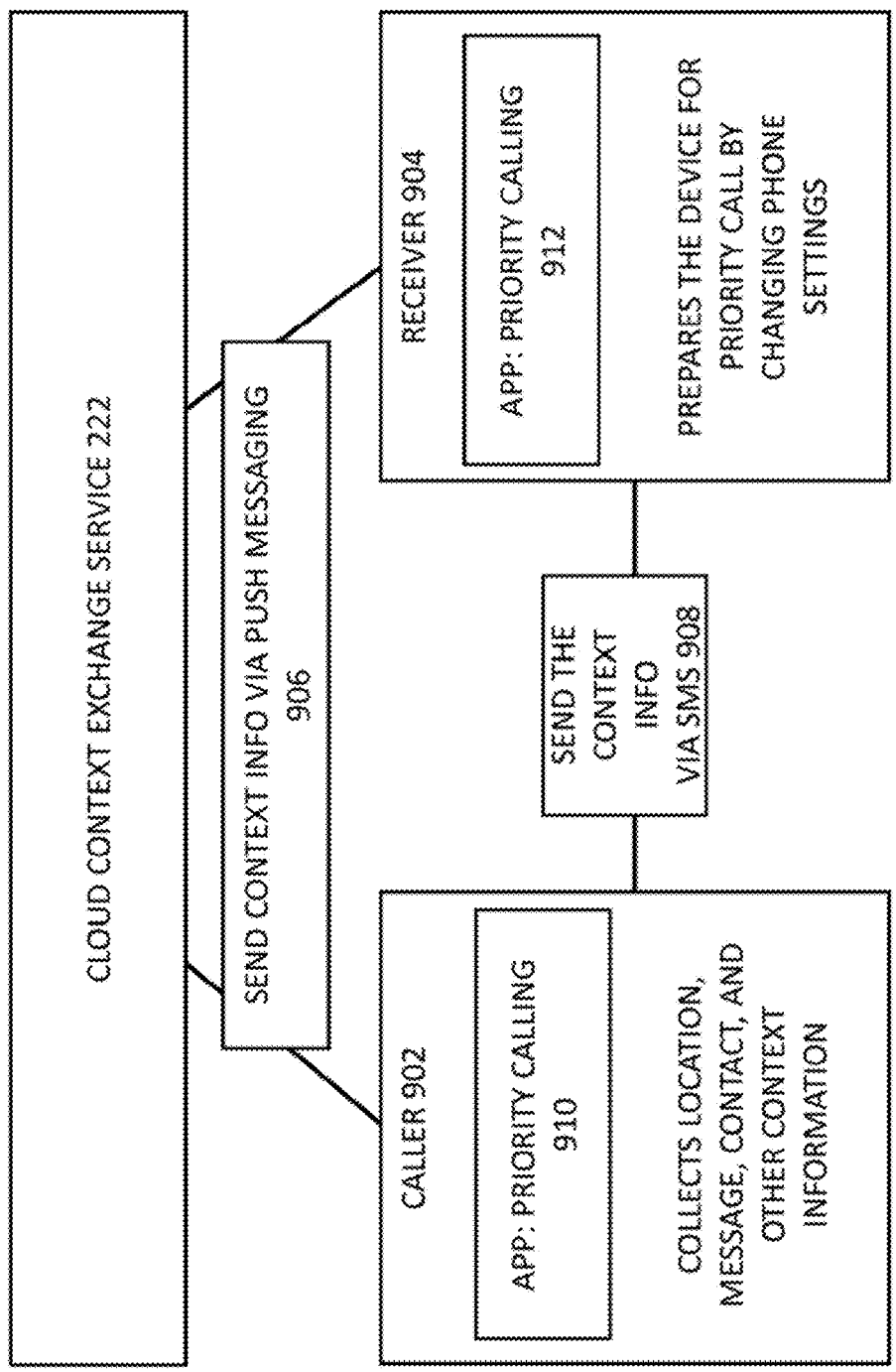
FIG. 9 shows a block diagram illustrating different types of out-of-band channels that can be used for transmitting context information, according to some embodiments of the disclosure.

FIG. 9 shows a block diagram illustrating different types of out-of-band channels that can be used for transmitting context information, according to some embodiments of the disclosure. The delivery of context information can be done through one or more out-of-band communication channels, e.g., such as a data communication channel, SMS/MMS communication channel, etc. Caller 902 (e.g., a first electronic device) and receiver 904 (e.g., a second electronic device) are shown to illustrate the process of the caller 902 making a priority call to receiver 904. The FIGURE shows two possibilities: a) sending context information via a push messaging communication channel via the context exchange cloud service 222 (906), and (b) sending context information via an SMS message or an MMS message (908). Typically, the caller 902 initiates a priority call using an application 910 for priority calling. The priority call is received as incoming user communication being at the receiver 904. The incoming user communication received by application 912 at the receiver 904 may comprise an incoming voice or video call, and the context information being delivered to the receiver 904 indicates that the incoming voice or video call is a priority call. The context information can include, but not limited to, location information of the caller, priority level, short text on intent of the call (with a limited number of characters), etc. Such context information, e.g., can be delivered from the caller 902 to the receiver 904 over the push messaging communication channel, or using an SMS message or an MMS message in accordance with a pre-defined template or format.

When context information is received at the receiver 904, the application 912 can prepare the receiver 904 (e.g., the second electronic device) for a priority call from the caller 902. For instance, the application 912 can change the ringtone based on the context information, e.g., changing the device from silent to regular mode just until the call is completed or a threshold time has passed. The receiver 904 can return to its previous state after the call is completed or the threshold time has passed. The priority call still uses the traditional voice channel for the call. As a result when the actual call is received, it is the special priority ringtone that informs the receiver of an urgent call. Context information can be prominently displayed superimposed on the call screen. A response from the receiver 904 can include context information of the receiver 904 to provide acknowledgement of the priority call, e.g., indicate to the caller 902 if the receiver 904 missed the priority call, or share with the caller 902 the location information of the receiver 904 (if opt-in). In some embodiments, the application 910 continually tries to call the receiver 904 if the phone is busy.

Priority Calling is Unique

In many ways, priority calling can be considered a special way of making calls. In contrast from a normal call, priority calling provides the caller 902 with the ability to make a special call (priority call), which allows the receiver 904 to view not just who is calling, but why he/she is calling, with some extra context information, even in silent mode. This smart exchange of context information between caller 902 and the receiver 904 allows the receiver to view context information prior to picking up the call. For example, if John wants to convey a message (could be important) to Smith. John calls Smith, if call is not answered John leaves a text message. With this approach John would not have to send an extra text message, one priority call is enough to convey the information, even when not answered. Also, Smith does not need to make the association between the text message and the recently missed call to find out that the recently missed call was important and corresponds to the text message John sent. Below are some of the further exemplary use cases:

Consumer: A child has missed his school bus and wants his father or mother to pick him up from a remote location. The parent's phone is silent mode as he/she is in a meeting. This call is urgent but the parent is not aware of it as the phone is in silent mode. Even if the parent sees the call, they may think of it as some sort of prank from the kid.

Consumer: A member of a family is on a long drive and the car broke down. The member is unable to contact the other members.

Corporate: A manager wants to call an urgent meeting on a Saturday, as the client requested, but the team members may not be reachable.

General: Even if a call (or a priority call) is missed, there's a unique notification on receiver's phone that allows him/her to view who called and where they called from.

Medical: Make a priority call to doctor and include context information collected from the caller Consumer: A member of family goes missing on a family trip.

Consumer: someone is getting kidnapped and wants to silently share their location with friends or family.

Typical current solutions provide a way for customizing ringtone per contact or per contact group basis, while this is a good way of knowing who is calling just by listening to the tone, context information is still not being conveyed effectively. It does not provide information why the call is being made and from where, etc. Typical solution people use when one want to reach urgently is to make a call, if there is no response, call again and/or send a text, and does not provide a way to differentiate between the calls. The embodiments disclosed herein allowing the secure exchange of context information address these issues elegantly.

Priority Calling: Message Formats

Figure 10:
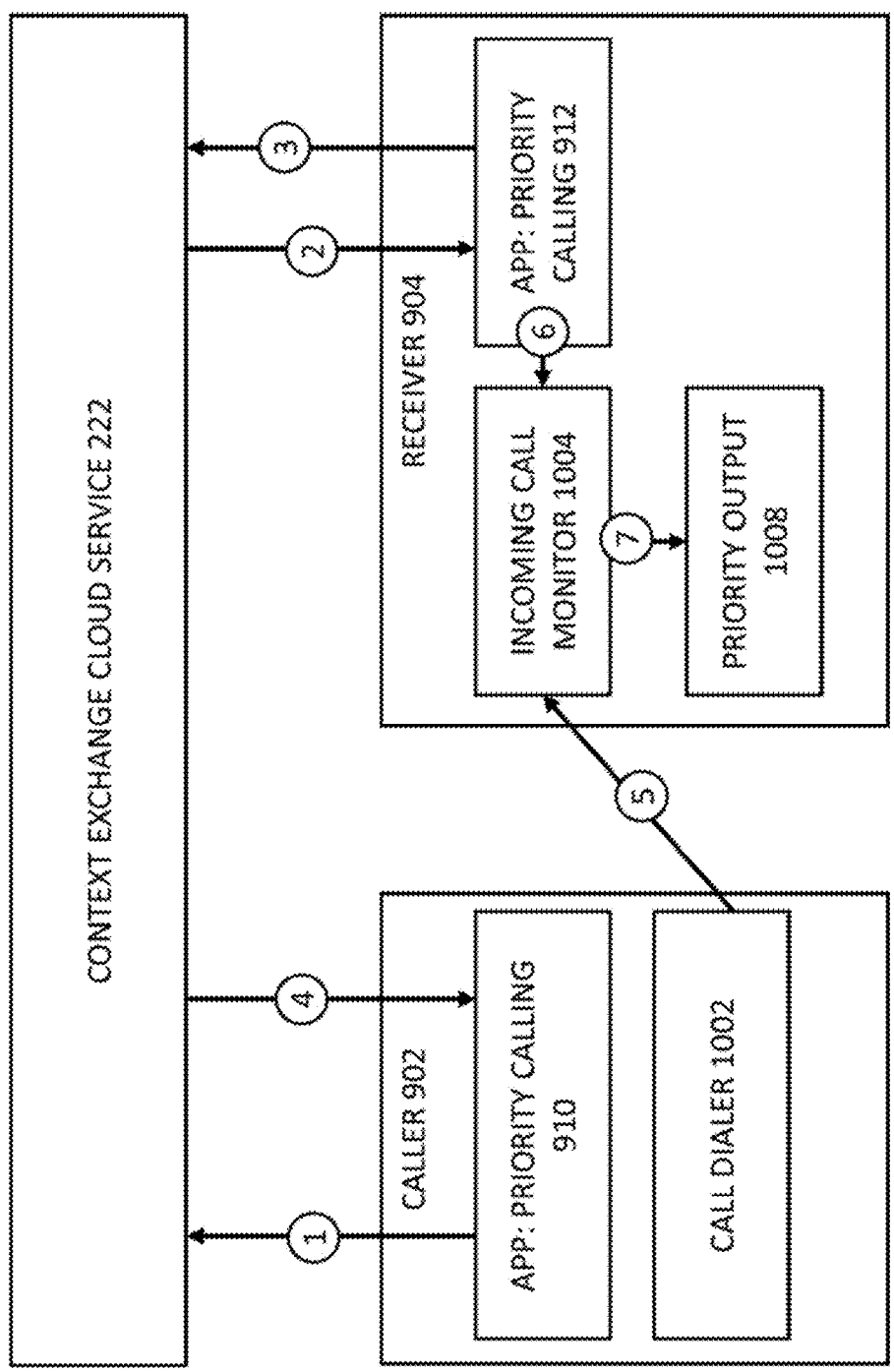
FIG. 10 shows a block diagram for receiving/processing of an incoming user communication and context information used in priority calling, according to some embodiments of the disclosure.

FIG. 10 shows a block diagram for receiving/processing of an incoming user communication and context information used in priority calling, according to some embodiments of the disclosure. The various parts of the flow of information and/or processes are denoted by markers shown as circles with numerals, and description below corresponds to the numerals.

1. Electronic device of caller 902, e.g., application 910, sends a priority call request to electronic device of receiver 904. A priority call request object is created by the priority call system when user selects a phone number to make the call.
    a. Priority call context in the priority call request object can encapsulate the context information of the caller 902. As mentioned before, the context information can be collected easily by the electronic device of caller 902.
    b. For instance, the electronic device of caller 902 can collect context information by, e.g.,
        i. using sensors like location sensors, network radios, accelerometer, heart rate/pulse monitor and any other sensors,
        ii. from companion/accessory devices like health/fitness wearables, iii. ambient context like proximal trusted devices—trust can be is derived automatically based on known devices or configured by user (the proximity can be determined by using radios like Bluetooth Low Energy),
iv. geo-fence context (user configured perimeter that is designated as safe or unsafe,
v. user provided message, and
vi. priority level.

```
Exemplary data formats:
PriorityCallRequest {
    Caller <Name, Number>
    Called <Number>
    Context <PriorityCallContext>
}
PriorityCallContext {
    Priority Level <high/medium/low>
    GeofenceUserIsIn<name>
    Message<String>
    TrustedDevicesNearby<Device List>
    Heartrate<heartrate>
    Location<latitude, longitude, address>
    <any other suitable context information>
}
```

2. The priority call request object is sent to the electronic device of receiver 904 (e.g., application 912) via the context exchange cloud service 222.
3. Application 912 can acknowledge the receipt priority call request.
4. The context exchange cloud service 222 forwards the acknowledgement to application 910.
5. Caller 902, e.g., call dialer 1002, initiates a voice call with receiver 904. The voice call is received by incoming call monitor 1004 of receiver 904.
6. Application 912 makes changes to the settings of receiver 904, e.g., settings of the incoming call monitor 1004 to generate an appropriate output based on the context information in the priority call request object.
   a. For instance, processing the incoming user communication (i.e., the call) can include adjusting ringtone settings of the receiver 904 (e.g., the electronic device) based on the context information.
   b. Adjusting the ringtone settings provides a mechanism to play priority call ringtone on the receiver 904 to audibly indicate to the user at the receiver 904 that the incoming user communication is an incoming priority call. The receiver 904 can play (e.g., using priority output 1008) the priority call ringtone (even when in silent mode), if the incoming caller is the priority caller (indicated by the priority call request object), or else the default ringtone is played.
7. Incoming call monitor 1004 triggers priority output 1008 to generate the appropriate output.
   a. Besides outputting a ring tone, another example of the output can include visually conveying the context information at the receiver 904. For instance, processing the first incoming user communication based on the first context information comprises generating an overlay comprising the first context information and rendering the overlay for display on the first electronic device. The context information when received at the receiver 904 (message, caller's location, name, number etc.) is converted to a meaningful and displayable format, and this format is overlaid over the incoming call screen. So the receiver can see the information about the call without actually picking it up.

In some cases, the complete context need not be sent while the setting up the priority call. The context information can be sent to the called phone even while the call is in progress as an when the new context becomes available. This can enable fast setup of priority calls.

Priority Call: Missed Priority Call

When a priority call is missed, the priority call application has a way to inform user if there was a priority call and user did not pick it up. The mechanism can involve an in-application notification and/or system notifications. Notifications can be generated on the receiver 904 if call is placed but the receiver 904 did not pick up the call, or if the placement of call fails due to voice network is not available at that time. Based on user preference, the priority calling application at the caller 902 can retry the call after some predetermined interval. The caller 902 can configure alternate contacts to call if the receiver 904 did not respond to the priority call (e.g., no acknowledgement received). For instance, a child can have both the parents as alternate contacts in case one parent cannot be reached.

Priority Calling: Process Flow

One aspect of the present disclosure is to provide an application 910 for the caller to easily make priority calls to other users. For instance, the application include a special dialer or a standard dialer that is customized by adding special controls. The application would provide a way to display a subset of contacts list that is either auto-configured based on user past calling history or pre-configured or both. User can select one of the contacts and initiate a priority call by using a user interface.

Figure 11:
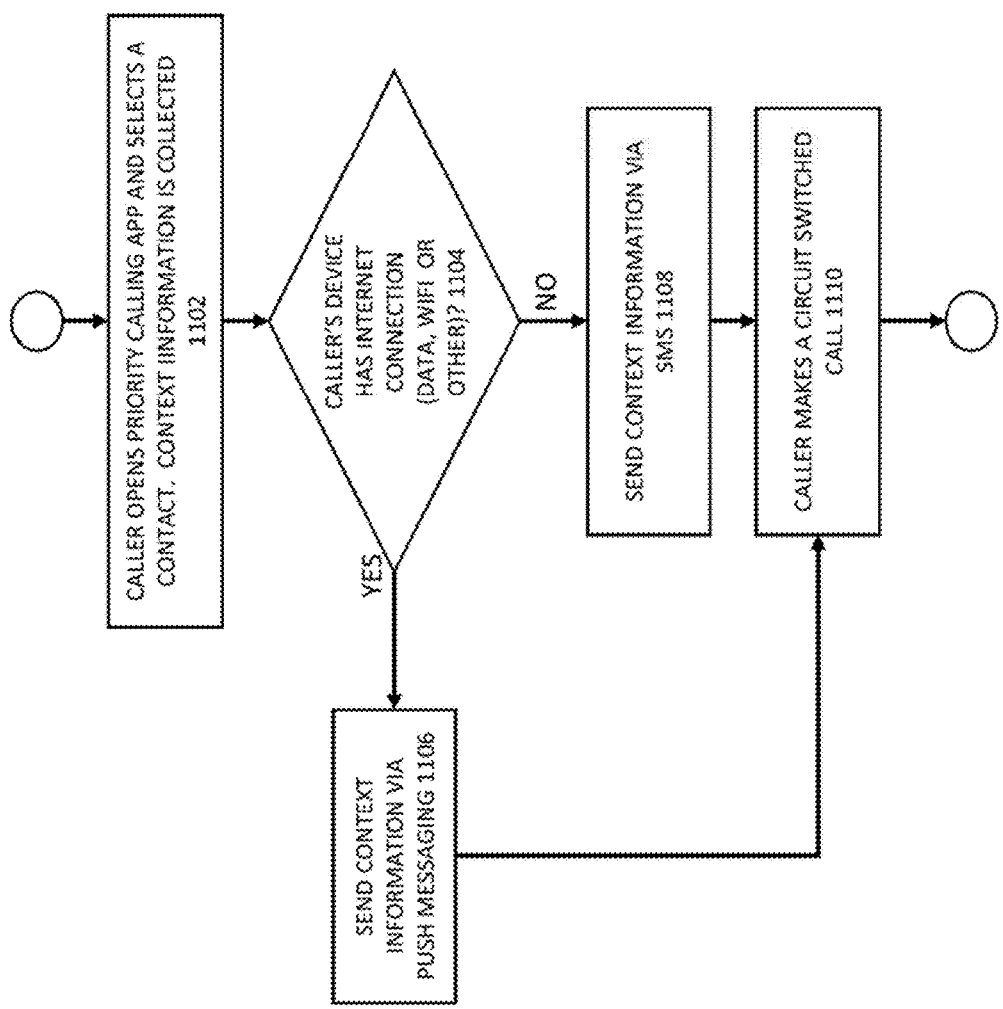
FIG. 11 is a flow diagram for transmitting of user communication and context information used in priority calling, according to some embodiments of the disclosure.

FIG. 11 is a flow diagram for transmitting of user communication and context information used in priority calling, according to some embodiments of the disclosure. The user at caller 902 can open the priority calling application (e.g., by selecting certain user interface controls or providing certain user input to initiate the priority calling application) and selects a contact (1102). The electronic device of caller 902 can initiate the priority calling application. The electronic device of caller 902 can collect context information (1102).

One aspect of the present disclosure is the effective exchange and coordination of context between caller 902 and receiver 904 to enhance the quality of communication. This exchange of context information can be done via Internet (push messaging) or SMS (from caller to receiver), so internet connectivity on the receiver's or caller's device is not mandatory, although the context shared can be much more informative and meaningful with Internet. If the caller 902's device has an Internet connection (data, WiFi, or other suitable data connection) (1104), the context information is transmitted via push messaging (1106). In some embodiments, a priority calling application at the caller 902 can initiates a handshake protocol with the application 912 at the receiver 904 to enable the receiver 904 to receive context information for a priority call. If the caller 902's device does not have the Internet connection, the caller's device can send the context information via SMS (1108). The electronic device of caller 902 can make a circuit switched call via a voice communication channel with the receiver 904 (1110).

Figure 12:
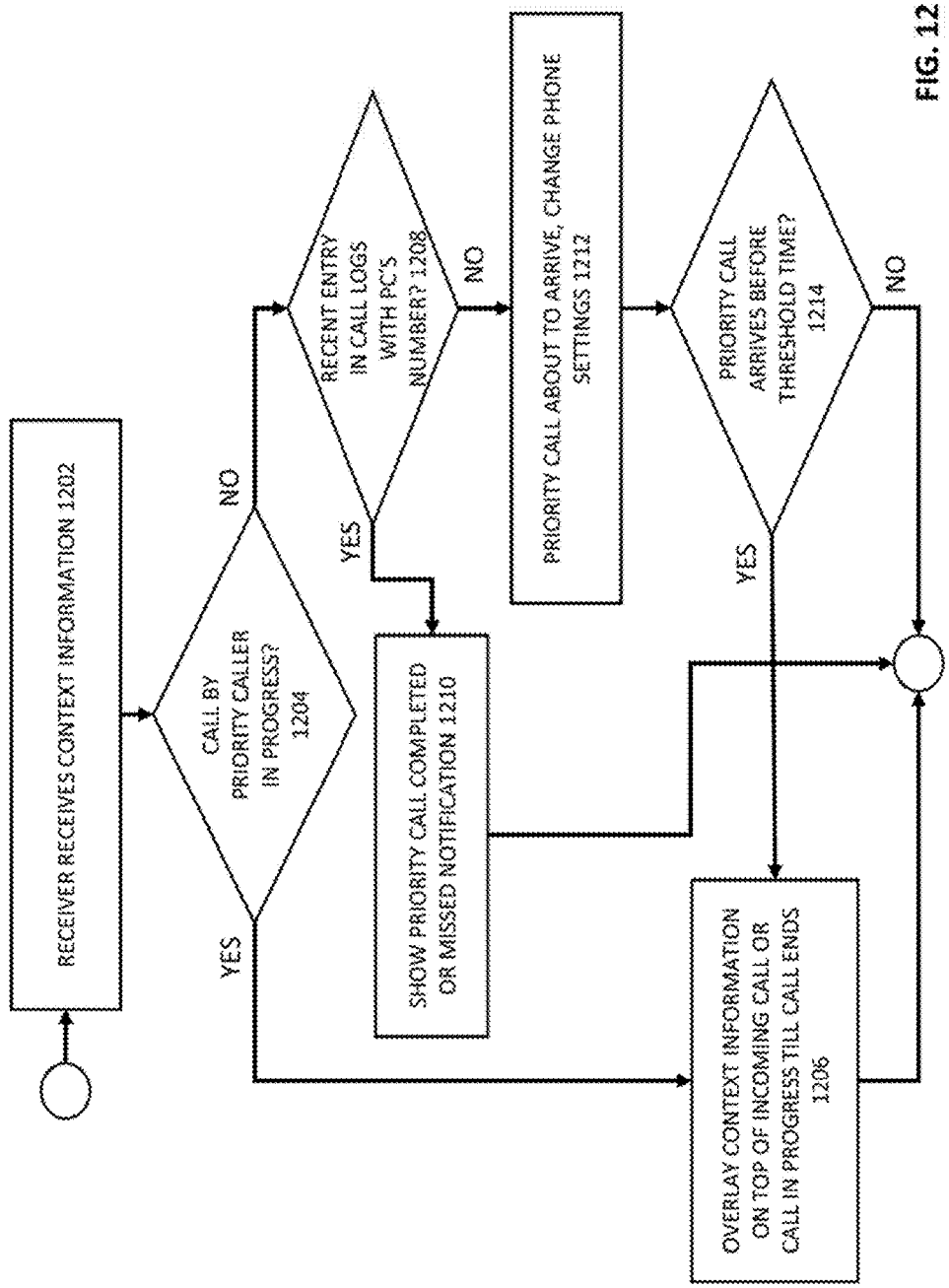
FIG. 12 is a flow diagram for receiving and processing of user communication and context information used in priority calling, according to some embodiments of the disclosure.

FIG. 12 is a flow diagram for receiving and processing of user communication and context information used in priority calling, according to some embodiments of the disclosure. The receiver 904 receives context information corresponding to the priority call (1202). The receiver 904 can acknowledge the receipt, if desired. Once the handshake is done, the electronic device of the receiver 904 monitors the incoming calls and may also modify the device configuration to enable the electronic device of the receiver 904 to receive the priority call.

The receiver 904 can determine whether there is a call by the caller 902 (indicated by the context information received) already in progress 1204. If there is a call by the caller 902 already in progress, the context information is provided to the user of the receiver 904 in an overlay on top of the incoming call or call in progress until the call ends (1206). The receiver 904 can also be notified of the context information through haptic output (e.g., vibration) and/or audio output. If there is no call by the caller 902 already in progress, the receiver 904 can determine whether a history of incoming communications includes the first incoming communication (e.g., by matching phone numbers in the history with the phone number of the caller 902 as specified by the context information) (1208), to determine if the priority call has already occurred. If yes, in response to determining that the history includes the first incoming communication, the receiver 904 can render a notification for output by the first electronic device indicating a priority incoming communication has completed or was missed (1210). Otherwise, the receiver 904 can wait for the priority call to arrive and change phone settings according to the context information (1212). The receiver 904 checks if the priority call arrives before a predetermined threshold time (1214). If yes, the context information is provided to the user of the receiver 904, e.g., in an overlay on top of the incoming call or call in progress until the call ends (1206). Otherwise, the process ends, and the receiver 904 may revert the phone settings back to their previous state (context information may not be conveyed to the receiver 904).

Priority Calling: Various Features

A mechanism on the receiver device provides a special audible and visual indicator to indicate that the call is priority call when it's received. The priority call indicators are independent of the standard device configuration. FIGS. 4 and 6 shows the flowchart of the application on caller phone and receiver phone.

A mechanism to notify the call receiver that a priority call is in waiting state when he/she is already in a call. An audio notification is given to the receiver to inform about the waiting priority call, user can then make a sound decision about switching to the priority call. In case of conflicting priority calls like when a priority call is in progress and another priority call is in waiting state, the priority is allotted in chronological order, other priority calls will be suppressed after a single audio notification, with a missed priority call notification. This ensures the reception of priority call.

A mechanism to convey message to the call receiver. If the receiver is away from the phone and all the calls/priority calls are getting missed or the mobile network is not available for voice call, there is a mechanism to send voice message that ensure the message delivery with caller's location and other context information.

Other Embodiments and System Illustrations

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. Moreover, the systems disclosed herein are readily scalable and can be implemented across a large number of components, as well as more complicated/sophisticated arrangements and configurations. Accordingly, the examples provided should not limit the scope or inhibit the broad teachings of the systems disclosed herein as potentially applied to a myriad of other architectures.

It is also important to note that the functions related to priority calling and personal safety systems as disclosed herein, illustrate only some of the possible personal safety systems functions that may be executed by, or within, systems illustrated in the FIGURES, and 6. Some of these operations (e.g., in relation to all the FIGURES) may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Additionally, although systems in the FIGURES have been illustrated with reference to particular elements and operations that facilitate the functions of the personal safety systems, these elements and operations may be replaced by any suitable architecture, protocols, and/or processes that achieve the intended functionality of priority calling and personal safety systems.

In one example implementation, various devices or components involved in implementing the embodiments described herein can include software for achieving the described functions, and these devices or components disclosed herein may comprise software embodied in one or more non-transitory, tangible media for facilitating the activities described herein. At least a part of the systems and devices (e.g., electronic devices, context exchange agent, context exchange cloud service, applications, and any components shown in the FIGURES for enabling priority calling and personal safety systems) disclosed herein may also include a memory device (or memory element) for storing information to be used in achieving the functions as outlined herein. Additionally, the systems and devices (e.g., electronic devices context exchange agent, context exchange cloud service, applications, and any components shown in the FIGURES for enabling priority calling and personal safety systems) described herein may include one or more processors that is capable of executing software or an algorithm to perform the functions as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in any of the figures/drawings included herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element is provided to store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It should be noted that much of the infrastructure discussed herein (e.g., electronic devices, context exchange agent, context exchange cloud service, applications, and any components shown in the FIGURES for enabling priority calling and personal safety systems) can be provisioned as part of any type of network element. As used herein, the terms e.g., electronic devices, context exchange agent, (especially) context exchange cloud service, applications, and any components shown in the FIGURES for enabling priority calling and personal safety systems can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices (e.g., electronic devices, context exchange agent, context exchange cloud service, applications, and any components shown in the FIGURES for enabling priority calling and personal safety systems having network connectivity or communication channel with another component) can include software to achieve (or to foster) the concept of priority calling and personal safety systems. This could include the implementation of instances of any of the components, engines, logic, etc. shown in the diagrams included herein. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the personal safety systems described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the figures/drawings included herein (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signalling scenarios and patterns that may be executed by, or within, communication systems shown in the figures/drawings included herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the figures/drawings in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

Examples

AA: Exchanging context between devices comprises unidirectional and bidirectional sharing of "context" or context information between context exchange agents of two devices, where the context information is provided to a context exchange cloud service adapted to provide a safety application (in some cases while cooperating with applications on the two devices). The safety application may include many features which takes the "context" or context information provided by one or more devices and provide a rich personal safety user experience to the users. The user experience is illustrated by the graphical representations shown in FIGS. 5, 7 and 8A-B.

AB: AA can optionally include providing a secure context channel in additional to a separate voice channel, wherein the secure context channel is configured to allow a caller to provide context information such as location, priority, message, etc. to the receiver in addition to making a call.

AC: AA or AB can optionally include providing a secure context exchange channel between a plurality of devices for continuously exchanging location information to implement a follow me application. Optionally, geo-fencing can be provided as part of the context exchange cloud service to generate notifications if a location of a device enters a specified zone. Optionally, distance calculations can be provided as part of the context exchange cloud service to warn if another device is falling behind. Optionally, traffic/emergency information can be provided to a device if the device approaches a traffic/emergency situation.

AD: AA, AB, or AC can optionally include providing a secure context exchange channel for monitoring and exchanging other information provided by the devices, e.g., location, camera data, pulse data, etc.

AE: AA, AB, AC, or AD can optionally include providing a secure context exchange channel for exchanging safety information (location) between members of a family, transmitting messages, and broadcasting messages between devices used by the family, and so forth.

Example 1 is a first electronic device, comprising: a memory element operable to store electronic code; and a processor operable to execute instructions associated with the electronic code, said instructions for receiving user communications and context information associated with user communications, such that the first electronic device is configured to: receive a first incoming user communication from a second electronic device through a first communication channel; receive the first context information from a context exchange cloud service through a second communication channel that is out-of-band with respect to the first communication channel; determine whether the context information corresponds to the first incoming user communication; and in response to determining that the first context information corresponds to the first incoming user communication, process the first incoming user communication based on the first context information.

In Example 2, the first electronic device of Example 1 can optionally include the first electronic device being further configured to, prior to receiving the first context information: receive, from the context exchange cloud service, a request requesting approval to allow context information associated with the user of the second electronic device to be shared with the first electronic device; and transmit, to the context exchange cloud service, a response indicating the approval.

In Example 3, the first electronic device of Example 1 or 2 can optionally include the first electronic device being further configured to: configuring the second communication channel as a push message channel for receiving further context information associated with the second electronic device from the context exchange cloud service.

In Example 4, the first electronic device of Example 3 can optionally include the further context information comprising a plurality of location information associated with the second electronic device.

In Example 5, the first electronic device of Example 4 can optionally include the first electronic device being further configured to generate a map image representing the plurality of location information and rendering the map image for display on the first electronic device.

In Example 6, the first electronic device of any one of Examples 3-5 can optionally include the further context information comprising a notification that context information associated with the second electronic device received at the context exchange cloud service violates one or more policies.

In Example 7, the first electronic device of any one of Examples 1-6, can optionally include the first electronic device being further configured to: determine context information associated with the first electronic device; and transmit a third context information associated with the first electronic device to the context exchange cloud service over the second communication channel.

In Example 8, the first electronic device of any one of Examples 1-7 can optionally include the context information comprising one or more of the following: priority information, location information, geo-fence information, reputation of location information, biometric information, time information, electronic device information, and priority media content.

In Example 9, the first electronic device of any one of Examples 1-8 can optionally include the first communication channel comprising a voice call channel, and the second communication channel comprising a data communication channel.

In Example 10, the first electronic device of any one of Examples 1-9 can optionally include the first incoming user communication being an incoming voice and/or video call, and the first contextual information indicating the incoming call is a priority call.

In Example 11, the first electronic device of any one of Examples 1, 2, 8, and 10 can optionally include the first contextual information being received in a Short Messaging Service message and/or a Multimedia Messaging Service message.

In Example 12, the first electronic device of any one of Examples 1-11 can optionally include processing the first incoming user communication based on the first context information comprising: adjusting ringtone settings of the first electronic device based on the first context information.

In Example 13, the first electronic device of any one of Examples 1-12 can optionally include processing the first incoming user communication based on the first context information comprising: generating an overlay comprising the first context information; and rendering the overlay for display on the first electronic device.

In Example 14, the first electronic device of any one of Examples 1-13, wherein processing the first incoming user communication based on the first context information comprising: determining whether a history of incoming communications includes the first incoming communication; and in response to determining that the history includes the first incoming communication, rendering a notification for output by the first electronic device indicating a priority incoming communication has completed or was missed.

Example 15 is a first electronic device for receiving user communications and context information associated with user communications, comprising: (means for storing electronic code;) means for receiving a first incoming user communication from a second electronic device through a first communication channel; means for receiving the first context information from a context exchange cloud service through a second communication channel that is out-of-band with respect to the first communication channel; means for determining whether the context information corresponds to the first incoming user communication; and means for processing, in response to determining that the first context information corresponds to the first incoming user communication, the first incoming user communication based on the first context information.

In Example 16, the first electronic device of Example 15 can optionally include: means for receiving, from the context exchange cloud service, a request requesting approval to allow context information associated with the user of the second electronic device to be shared with the first electronic device, prior to receiving the first context information; and means for transmitting, to the context exchange cloud service, a response indicating the approval, prior to receiving the first context information.

In Example 17, the first electronic device of Example 15 or 16 can optionally include means for configuring the second communication channel as a push message channel for receiving further context information associated with the second electronic device from the context exchange cloud service.

In Example 18, the first electronic device of Example 17 can optionally include the further context information comprising a plurality of location information associated with the second electronic device.

In Example 19, the first electronic device of Example 18 can optionally include means for generating a map image representing the plurality of location information and rendering the map image for display on the first electronic device.

In Example 20, the first electronic device of any one of Examples 17-19 can optionally include the further context information comprising a notification that context information associated with the second electronic device received at the context exchange cloud service violates one or more policies.

In Example 21, the first electronic device of any one of Examples 15-20 can optionally include means for determining context information associated with the first electronic device; and means for transmitting a third context information associated with the first electronic device to the context exchange cloud service over the second communication channel.

In Example 22, the first electronic device of any one of Examples 15-21 can optionally include the context information comprising one or more of the following: priority information, location information, geo-fence information, reputation of location information, biometric information, time information, electronic device information, and priority media content.

In Example 23, the first electronic device of any one of Examples 15-22 can optionally include the first communication channel comprising a voice call channel, and the second communication channel comprises a data communication channel.

In Example 24, the first electronic device of any one of Examples 15-23 can optionally include the first incoming user communication being an incoming voice and/or video call, and the first contextual information indicating the incoming call is a priority call.

In Example 25, the first electronic device of any one of Examples 15, 16, 22, and 24, can optionally include the first contextual information being received in a Short Messaging Service message and/or a Multimedia Messaging Service message.

In Example 26, the first electronic device of any one of Examples 15-25, can optionally include the means for processing the first incoming user communication based on the first context information comprising: means for adjusting ringtone settings of the first electronic device based on the first context information.

In Example 27, the first electronic device of any one of Examples 15-26, can optionally include the means for processing the first incoming user communication based on the first context information comprising means for generating an overlay comprising the first context information; and means for rendering the overlay for display on the first electronic device.

In Example 28, the first electronic device of any one of Examples 15-24, wherein the means for processing the first incoming user communication based on the first context information comprising: means for determining whether a history of incoming communications includes the first incoming communication; and means for rendering, in response to determining that the history includes the first incoming communication, a notification for output by the first electronic device indicating a priority incoming communication has completed or was missed.

In Example 29, the first electronic device of any one of Examples 15-28, wherein the first electronic device is a computing system.

Example 30 is a method for receiving user communications and context information associated with user communications at a first electronic device, the method comprising: receiving a first incoming user communication from a second electronic device through a first communication channel; receiving the first context information from a context exchange cloud service through a second communication channel that is out-of-band with respect to the first communication channel; determining whether the context information corresponds to the first incoming user communication; and processing, in response to determining that the first context information corresponds to the first incoming user communication, the first incoming user communication based on the first context information.

In Example 31, the method of Example 30 can optionally include: receiving, from the context exchange cloud service, a request requesting approval to allow context information associated with the user of the second electronic device to be shared with the first electronic device, prior to receiving the first context information; and transmitting, to the context exchange cloud service, a response indicating the approval, prior to receiving the first context information.

In Example 32, the method of Example 30 or 31, can optionally include: configuring the second communication channel as a push message channel for receiving further context information associated with the second electronic device from the context exchange cloud service.

In Example 33, the method of Example 32 can optionally include the further context information comprising a plurality of location information associated with the second electronic device.

In Example 34, the method of Example 33 can optionally include generating a map image representing the plurality of location information and rendering the map image for display on the first electronic device.

In Example 35, the method of any one of Examples 32-34 can optionally include the further context information comprising a notification that context information associated with the second electronic device received at the context exchange cloud service violates one or more policies.

In Example 36, the method of any one of Examples 30-35 can optionally include determining context information associated with the first electronic device; and transmitting a third context information associated with the first electronic device to the context exchange cloud service over the second communication channel.

In Example 37, the method of any one of Examples 30-36, can optionally include the context information comprising one or more of the following: priority information, location information, geo-fence information, reputation of location information, biometric information, time information, electronic device information, and priority media content.

In Example 38, the method of any one of Examples 30-37 can optionally include the first communication channel comprises a voice call channel, and the second communication channel comprises a data communication channel.

In Example 39, the method of any one of Examples 30-38 can optionally include the first incoming user communication being an incoming voice and/or video call, and the first contextual information indicating the incoming call is a priority call.

In Example 40, the method of any one of Examples 30, 31, 37, and 38 can optionally include the first contextual information being received in a Short Messaging Service message and/or a Multimedia Messaging Service message.

In Example 41, the method of any one of Examples 30-40 can optionally include processing the first incoming user communication based on the first context information comprising: adjusting ringtone settings of the first electronic device based on the first context information.

In Example 42, the method of any one of Examples 30-41 can optionally include processing the first incoming user communication based on the first context information comprises: generating an overlay comprising the first context information; and rendering the overlay for display on the first electronic device.

In Example 43, the method of any one of Examples 30-42 can optionally include processing the first incoming user communication based on the first context information comprises: determining whether a history of incoming communications includes the first incoming communication; and rendering, in response to determining that the history includes the first incoming communication, a notification for output by the first electronic device indicating a priority incoming communication has completed or was missed.

Example 44 is one or more machine-readable media including code that, when executed, causes one or more machine to perform the method of any one of Examples 30-43.

Example 45 is an apparatus comprising means for performing the method of any one of Examples 30-43.

In Example 46, the apparatus of Example 45 can optionally include the means for performing the method comprising a processor and a memory.

In Example 47, the apparatus of Example 46 can optionally include the memory comprising machine-readable instructions that, when executed, cause the apparatus to perform the method.

In Example 48, the apparatus of any one of Examples 45-47 can optionally include the apparatus is a computing system.

Example 49 is at least one computer-readable media comprising instructions that, when executed, implement the method of any one of Examples 30-43 or realize the apparatus of any one of Examples 45-48.

Example 50 is one or more non-transitory, tangible, computer-readable storage media encoded with instructions that, when executed, cause one or more processing units to perform operations for receiving user communications and context information associated with user communications at a first electronic device, the operations comprising: receiving a first incoming user communication from a second electronic device through a first communication channel; receiving the first context information from a context exchange cloud service through a second communication channel that is out-of-band with respect to the first communication channel; determining whether the context information corresponds to the first incoming user communication; and processing, in response to determining that the first context information corresponds to the first incoming user communication, the first incoming user communication based on the first context information.

In Example 51, the media of Example 50 can optionally include the operations further comprising: receiving, from the context exchange cloud service, a request requesting approval to allow context information associated with the user of the second electronic device to be shared with the first electronic device, prior to receiving the first context information; and transmitting, to the context exchange cloud service, a response indicating the approval, prior to receiving the first context information.

In Example 52, the media of Example 50 or 51 can optionally include the operations further comprising: configuring the second communication channel as a push message channel for receiving further context information associated with the second electronic device from the context exchange cloud service.

In Example 53, the media of Example 52 can optionally include the further context information comprising a plurality of location information associated with the second electronic device.

In Example 54, the media of Example 53 can optionally include the operations further comprising generating a map image representing the plurality of location information and rendering the map image for display on the first electronic device.

In Example 55, the media of any one of Examples 52-54 can optionally include the further context information comprising a notification that context information associated with the second electronic device received at the context exchange cloud service violates one or more policies.

In Example 56, the media of any one of Examples 50-55 can optionally include the operations further comprising: determining context information associated with the first electronic device; and transmitting a third context information associated with the first electronic device to the context exchange cloud service over the second communication channel.

In Example 57, the media of any one of Examples 50-56 can optionally include the context information comprising one or more of the following: priority information, location information, geo-fence information, reputation of location information, biometric information, time information, electronic device information, and priority media content.

In Example 58, the media of any one of Examples 50-57 can optionally include the first communication channel comprising a voice call channel, and the second communication channel comprising a data communication channel.

In Example 59, the media of any one of Examples 50-58 can optionally include the first incoming user communication being an incoming voice and/or video call, and the first contextual information indicating the incoming call is a priority call.

In Example 60, the media of any one of Examples 50, 51, 57, and 58, can optionally include the first contextual information being received in a Short Messaging Service message and/or a Multimedia Messaging Service message.

In Example 61, the media of any one of Examples 50-60 can optionally include processing the first incoming user communication based on the first context information comprising: adjusting ringtone settings of the first electronic device based on the first context information.

In Example 62, the media of any one of Examples 50-61 can optionally include processing the first incoming user communication based on the first context information comprising: generating an overlay comprising the first context information; and rendering the overlay for display on the first electronic device.

In Example 63, the media of any one of Examples 50-62 can optionally include processing the first incoming user communication based on the first context information comprising: determining whether a history of incoming communications includes the first incoming communication; and rendering, in response to determining that the history includes the first incoming communication, a notification for output by the first electronic device indicating a priority incoming communication has completed or was missed.

The invention claimed is:

1. A first electronic device, comprising:
a memory element operable to store electronic code; and
a processor operable to execute instructions associated with the electronic code, said instructions for receiving user communications and first context information associated with user communications, such that the first electronic device is configured to:
receive a first incoming user communication from a second electronic device through a first channel wherein the first channel is a communication channel;
receive, from a context exchange cloud service, a request requesting approval to allow context information associated with a user of the second electronic device to be shared with the first electronic device;
transmit, to the context exchange cloud service, a response indicating the approval;
receive the first context information from the context exchange cloud service through a second channel that is out-of-band with respect to the first communication channel, wherein the out-of-band channel is configured to operate without interfering with the first channel;
determine whether the context information corresponds to the first incoming user communication; and
in response to determining that the first context information corresponds to the first incoming user communication, process the first incoming user communication based on the first context information.

2. The first electronic device of claim 1, wherein the first electronic device is further configured to:
configure the second channel as a push message channel for receiving further context information associated with the second electronic device from the context exchange cloud service.

3. The first electronic device of claim 2, wherein the further context information comprises a plurality of location information associated with the second electronic device.

4. The first electronic device of claim 3, wherein the first electronic device is further configured to generate a map image representing the plurality of location information and rendering the map image for display on the first electronic device.

5. The first electronic device of claim 2, wherein the further context information comprises a notification that context information associated with the second electronic device received at the context exchange cloud service violates one or more policies.

6. The first electronic device of claim 1, wherein the first electronic device is further configured to:
determine context information associated with the first electronic device; and
transmit a third context information associated with the first electronic device to the context exchange cloud service over the second channel.

7. The first electronic device of claim 1, wherein the context information comprises one or more of the following: priority information, location information, geo-fence information, reputation of location information, biometric information, time information, electronic device information, and priority media content.

8. The first electronic device of claim 1, wherein the first communication channel comprises a voice call channel, and the second channel comprises a data communication channel.

9. The first electronic device of claim 1, wherein the first incoming user communication is an incoming voice and/or video call, and the first context information indicates the incoming call is a priority call.

10. The first electronic device of claim 1, wherein the first context information is received in a Short Messaging Service message and/or a Multimedia Messaging Service message.

11. The first electronic device of claim 1, wherein processing the first incoming user communication based on the first context information comprises:
adjusting ringtone settings of the first electronic device based on the first context information.

12. The first electronic device of claim 1, wherein processing the first incoming user communication based on the first context information comprises:
generating an overlay comprising the first context information; and
rendering the overlay for display on the first electronic device.

13. The first electronic device of claim 1, wherein processing the first incoming user communication based on the first context information comprises:
determining whether a history of incoming communications includes the first incoming communication; and
in response to determining that the history includes the first incoming communication, rendering a notification for output by the first electronic device indicating a priority incoming communication has completed or was missed.

14. One or more non-transitory, tangible, computer-readable storage media encoded with instructions that, when executed, cause one or more processing units to perform operations for receiving user communications and first context information associated with user communications at a first electronic device, the operations comprising:
receiving a first incoming user communication from a second electronic device through a first channel wherein the first channel is a communication channel;
receiving, from a context exchange cloud service, a request requesting approval to allow context information associated with a user of the second electronic device to be shared with the first electronic device, prior to receiving the first context information; and
transmitting, to the context exchange cloud service, a response indicating the approval, prior to receiving the first context information;
receiving the first context information from the context exchange cloud service through a second channel that is out-of-band with respect to the first communication channel, wherein the out-of-band channel is configured to operate without interfering with the first channel;
determining whether the context information corresponds to the first incoming user communication; and
processing, in response to determining that the first context information corresponds to the first incoming user communication, the first incoming user communication based on the first context information.

15. The media of claim 14, wherein the operations further comprise:
configuring the second channel as a push message channel for receiving further context information associated with the second electronic device from the context exchange cloud service.

16. The media of claim 15, wherein the further context information comprises a plurality of location information associated with the second electronic device.

17. The media of claim 16, wherein the operations further comprise:
generating a map image representing the plurality of location information and rendering the map image for display on the first electronic device.

18. The media of claim 14, wherein the further context information comprises a notification that context information associated with the second electronic device received at the context exchange cloud service violates one or more policies.

19. A method for receiving user communications and first context information associated with user communications at a first electronic device, the method comprising:
receiving a first incoming user communication from a second electronic device through a first channel wherein the first channel is a communication channel;
receiving, from the context exchange cloud service, a request requesting approval to allow context information associated with a user of the second electronic device to be shared with the first electronic device, prior to receiving the first context information; and
transmitting, to the context exchange cloud service, a response indicating the approval, prior to receiving the first context information;
receiving the first context information from a context exchange cloud service through a second channel that is out-of-band with respect to the first communication channel, wherein the out-of-band channel is configured to operate without interfering with the first channel;
determining whether the context information corresponds to the first incoming user communication; and
processing, in response to determining that the first context information corresponds to the first incoming user communication, the first incoming user communication based on the first context information.

20. The method of claim 19, wherein the first incoming user communication is an incoming voice and/or video call, and the first context information indicates the incoming call is a priority call.

21. The method of claim 19, wherein processing the first incoming user communication based on the first context information comprises:
adjusting ringtone settings of the first electronic device based on the first context information.

22. The method of claim 19, wherein processing the first incoming user communication based on the first context information comprises:
generating an overlay comprising the first context information; and
rendering the overlay for display on the first electronic device.

23. The method of claim 19, wherein processing the first incoming user communication based on the first context information comprises:
determining whether a history of incoming communications includes the first incoming communication; and
rendering, in response to determining that the history includes the first incoming communication, a notification for output by the first electronic device indicating a priority incoming communication has completed or was missed.

24. The method of claim 19, further comprising configuring the second channel as a push message channel for receiving further context information associated with the second electronic device from the context exchange cloud service.

25. The method of claim 24, wherein the further context information comprises a plurality of location information associated with the second electronic device.

\* \* \* \* \*